US010815123B2

(12) United States Patent
Northrop

(10) Patent No.: US 10,815,123 B2
(45) Date of Patent: Oct. 27, 2020

(54) ENGINE FUEL-REFORMING REACTORS, SYSTEMS, AND METHODS

(71) Applicant: Regents of the University of Minnesota, Minneapolis, MN (US)

(72) Inventor: William Northrop, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 247 days.

(21) Appl. No.: 15/615,613

(22) Filed: Jun. 6, 2017

(65) Prior Publication Data

US 2017/0348659 A1 Dec. 7, 2017

Related U.S. Application Data

(60) Provisional application No. 62/346,219, filed on Jun. 6, 2016.

(51) Int. Cl.
*F02B 43/08* (2006.01)
*C01B 3/38* (2006.01)
(Continued)

(52) U.S. Cl.
CPC ............. *C01B 3/38* (2013.01); *B01J 19/2485* (2013.01); *C01B 3/047* (2013.01); *C01B 3/26* (2013.01); *C01B 3/323* (2013.01); *C01B 3/382* (2013.01); *F01N 3/0205* (2013.01); *F01N 3/2066* (2013.01); *F01N 13/10* (2013.01); *B01J 2219/2408* (2013.01); *B01J 2219/2411* (2013.01); *B01J 2219/2419* (2013.01); *B01J 2219/2428* (2013.01);
(Continued)

(58) Field of Classification Search
CPC ... Y02T 10/126; F02M 27/02; F01N 2240/30; F02B 51/02; F02B 43/04; F02D 19/0671
USPC .............................................................. 123/3
See application file for complete search history.

(56) References Cited

U.S. PATENT DOCUMENTS 4,062,806 A * 12/1977 Roberts ................ B01J 37/0219
126/19 R
5,794,601 A * 8/1998 Pantone .................... F01N 5/02
123/538

(Continued)

OTHER PUBLICATIONS

Abdul-Khalek and Kittelson "Real Time Measurement of Volatile and Solid Exhaust Particles Using a Catalytic Stripper," SAE Technical Paper, 462-78, Jan. 1995.
(Continued)

*Primary Examiner* — Long T Tran
*Assistant Examiner* — James J Kim
(74) *Attorney, Agent, or Firm* — Fish & Richardson P.C.

(57) ABSTRACT

An engine system for internal combustion and reformation of a fuel includes an engine, and a reforming reactor. The engine comprising an intake manifold for receiving a first fuel and an exhaust manifold for releasing an exhaust gas. The reforming reactor includes a first end portion, a second end, a wall having an outer surface and an inner surface. The inner surface defines an interior cavity for receiving the first fuel, a second fuel, reactants for the first fuel, or combinations thereof. The exhaust manifold of the system is sized and shaped for receiving a portion of the reforming reactor such that the exhaust gas flows along a surface of the reforming reactor within the exhaust manifold.

18 Claims, 8 Drawing Sheets

(51) Int. Cl.
 C01B 3/26 (2006.01)
 C01B 3/04 (2006.01)
 F01N 3/02 (2006.01)
 F01N 3/20 (2006.01)
 F01N 13/10 (2010.01)
 C01B 3/32 (2006.01)
 B01J 19/24 (2006.01)
(52) U.S. Cl.
 CPC ......... C01B 2203/0233 (2013.01); C01B 2203/0244 (2013.01); C01B 2203/0277 (2013.01); C01B 2203/06 (2013.01); C01B 2203/0811 (2013.01); C01B 2203/1005 (2013.01); C01B 2203/1023 (2013.01); C01B 2203/1047 (2013.01); C01B 2203/1052 (2013.01); C01B 2203/1076 (2013.01); C01B 2203/1217 (2013.01); C01B 2203/1229 (2013.01); C01B 2203/1247 (2013.01); C01B 2203/1276 (2013.01); C01B 2203/1288 (2013.01); C01B 2203/80 (2013.01); F01N 2240/30 (2013.01); F01N 2340/02 (2013.01); F01N 2610/03 (2013.01); F01N 2610/04 (2013.01); Y02E 60/364 (2013.01); Y02T 10/24 (2013.01)

(56) References Cited

U.S. PATENT DOCUMENTS

| | | | | |
|---|---|---|---|---|
| 6,079,373 | A * | 6/2000 | Kawamura | F01N 3/0857 123/3 |
| 7,063,131 | B2 | 6/2006 | Northrop | |
| 7,487,764 | B2 * | 2/2009 | Lee | F02M 27/02 123/538 |
| 8,931,283 | B2 | 1/2015 | Khan et al. | |
| 2010/0019506 | A1 | 1/2010 | Gong et al. | |
| 2010/0300382 | A1 * | 12/2010 | Yahagi | F01N 5/02 123/3 |
| 2010/0307725 | A1 * | 12/2010 | Penman | F02B 43/04 165/138 |
| 2012/0117943 | A1 * | 5/2012 | Pignon | F01N 3/2807 60/273 |
| 2014/0041365 | A1 * | 2/2014 | Doneva | C08L 23/08 60/274 |
| 2014/0283762 | A1 * | 9/2014 | Takeyama | F01N 3/36 123/3 |

OTHER PUBLICATIONS

Abdul-Khalek et al., "The Influence of Dilution Conditions on Diesel Exhaust Particle Size Distribution Measurements," SAE Technical Paper No. 1999-01-1142, Mar. 1, 1999.
Abu-Jrai et al., "Performance, combustion and emissions of a diesel engine operated with reformed EGR. Comparison of diesel and GTL fuelling," Fuel, 88(6):1031-1041, Jun. 2009.
Abu-Jrai et al., "The influence of H2H2 and CO on diesel engine combustion characteristics, exhaust gas emissions, and after treatment selective catalytic NOxNOx reduction," International Journal of Hydrogen Energy, 32(15):3565-3571, Oct. 2007.
Ahmed et al., "Hydrogen from hydrocarbon fuels for fuel cells," International Journal of Hydrogen Energy, 26(4):291-301, Apr. 2001.
Aicher and Griesser, "Novel process to evaporate liquid fuels and its application to the catalytic partial oxidation of diesel," Journal of Power Sources, 165(1):210-216, Feb. 2007.
Alperstein et al., "Fumigation kills smoke—improves diesel performance." SAE Transactions 66:574-588, Jan. 1958.
Babajimopoulos et al., "A fully coupled computational fluid dynamics and multi-zone model with detailed chemical kinetics for the simulation of premixed charge compression ignition engines." International Journal of Engine Research, 6(5):497-512, Oct. 2005.
Bika et al., "Cycle efficiency and gaseous emissions from a diesel engine assisted with varying proportions of hydrogen and carbon monoxide (synthesis gas)," No. 2011-01-1194, SAE Technical Paper, Apr. 12, 2011.
Bika et al., "Homogeneous charge compression ignition engine operating on synthesis gas," International Journal of Hydrogen Energy, 37(11):9402-9411, Jun. 2012.
Bika et al., "Hydrogen-fueled homogeneous charge compression ignition engine." No. 2011-01-0672, SAE Technical Paper, Apr. 12, 2011.
Bika et al., "Engine knock and combustion characteristics of a spark ignition engine operating with varying hydrogen and carbon monoxide proportions," International Journal of Hydrogen Energy, 36(8):5143-5152, Apr. 2011.
Bodke et al., "High selectivities to ethylene by partial oxidation of ethane," Science, 285(5428):712-715, Jul. 1999.
Colban et al., "On the Cyclic Variability and Sources of Unburned Hydrocarbon Emissions in Low Temperature Diesel Combustion Systems," SAE Technical Paper No. 2007-01-1837, 258:70, Jan. 2007.
Conte and Boulouchos, "Experimental investigation into the effect of reformer gas addition on flame speed and flame front propagation in premixed, homogeneous charge gasoline engines," Combustion and Flame, 146(1-2):329-347, Jul. 2006.
Curran et al., "Effect of E85 on RCCI Performance and Emissions on a Multi-Cylinder Light-Duty Diesel Engine," SAE Technical Paper No. 2012-01-0376, Apr. 2012.
Dec, "Advanced compression-ignition engines—understanding the in-cylinder processes," Proceedings of the Combustion Institute, 32(2):2727-2742, Jan. 2009.
Edwards and Wagner "Investigation potential efficiency improvement for lightduty transportation applications through simulation of an organic Rankine cycle for waste-heat recovery," In Proceedings of the ASME 2010 Internal Combustion Engine Division Fall Technical Conference, 1-13. San Antonio.
Eichmeier and U. Spicher, "Controlling Gasoline Low Temperature Combustion by Diesel Micro Pilot Injection," In Proceedings of the ASME 2011 Internal Combustion Engine Division Fall Technical Conference, Jan. 2010, Morgantown, W.V.
Elghawi et al., "GC-MS determination of low hydrocarbon species (C1-C6) from a diesel partial oxidation reformer," International Journal of Hydrogen Energy, 33(23):7074-7083, Dec. 2008.
Fang et al., "Dual-Fuel Diesel Engine Combustion with Hydrogen, Gasoline, and Ethanol as Fumigants: Effect of Diesel Injection Timing," J. Eng. Gas Turbines Power, 136(8):081502, Aug. 2014.
Fang et al., "Dual-fuel diesel engine combustion with hydrogen, gasoline and ethanol as fumigants: effect of diesel injection timing," Accepted to Proceedings of the ASME 2012 Internal Combustion Engine Division Fall Technical Conference, Vancouver, B.C.
Fennell et al., "GDI Engine Performance and Emissions with Reformed Exhaust Gas Recirculation ( REGR ) Reformate Combustion in Gasoline Engines" SAE Technical Paper No. 2013-01-0537, Apr. 2013.
Fox et al., "Combustion Syngas in Internal Combustion Engines. In Synthesis Gas Combustion: Fundamentals and Applications," 289-328.
Frigo et al., "Further Insight into the Possibility to Fuel a SI Engine with Ammonia plus Hydrogen," SAE Technical Paper No. 2014-32-0082, Nov. 11, 2014.
Golunski, "What is the point of on-board fuel reforming?" Energy & Environmental Science, 3(12):1918-1923, 2010.
Guo et al., "An experimental study on the effect of hydrogen enrichment on diesel fueled HCCI combustion," International Journal of Hydrogen Energy, 36(21):13820-30, Oct. 1, 2011.
Hanson et al., "Piston bowl optimization for RCCI combustion in a light-duty multi-cylinder engine," SAE International Journal of Engines, 5(2):286-99, May 2012.
Haputhanthri, "Ammonia Gasoline Fuel Blends: Feasibility Study of Commercially Available Emulsifiers and Effects on Stability and Engine Performance," SAE Technical Paper No. 2014-01-2759, Oct. 13, 2014.

(56) References Cited

OTHER PUBLICATIONS

Hessel et al., "Modeling Iso-octane HCCI Using CFD with Multi-Zone Detailed Chemistry; Comparison to Detailed Speciation Data Over a Range of Lean Equivalence Ratios," SAE Technical Paper No. 2008-01-0047, Apr. 2008.
Homan et al., "The effect of fuel injection on NOx emissions and undesirable combustion for hydrogen-fueled piston engines," International Journal of Hydrogen Energy, 8(2):131-46, Jan. 1983.
Hosseini and Checkel, "Effect of reformer gas on HCCI combustion—part II: low octane fuels," No. 2007-01-0206 SAE Technical Paper, Apr. 16, 2007.
Ickes et al., "Load limits with fuel effects of a premixed diesel combustion mode." SAE Technical Paper No. 2009-01-1972, Jun. 15, 2009.
Johannes et al., "Transient Performance of a Non-Catalytic Syngas Generator for Active DPF Regeneration and Nox Reduction," SAE Technical Paper No. 2008-01-0446, Apr. 14, 2008.
Kaddatz et al., "Light-duty reactivity controlled compression ignition combustion using a cetane improver," SAE Technical Paper No. 2012-01-1110, Apr. 16, 2012.
Kirwan et al., "Fast Start-Up On-Board Gasoline Reformer for Near Zero Emissions in Spark-Ignition Engines," SAE Technical Paper No. 2002-01-1011, Mar. 4, 2002.
Kittelson et al., "On-road and Laboratory Evaluation of Combustion Aerosols Part 2: Summary of Spark Ignition Engine Results," J. Aerosol Science, 37(8):931-949, Aug. 2006.
Kittelson, "Engines and Nanoparticles: A Review." J. of Aerosol Sci., 29(5-6):575-588, Jun. 1998.
Knafl et al., "The load limits of low temperature premixed compression ignition diesel combustion," In ISCE 2006, The 2nd International Symposium on Clean and High Efficiency Combustion in Engines, Tianjin, China, Jul. 2006.
Kodavasal et al., "An extended multi-zone combustion model for PCI simulation," Combustion Theory and Modeling, 15(6):893-910, Dec. 2011.
Kokjohn et al., "Fuel reactivity controlled compression ignition (RCCI) combustion in light-and heavy-duty engines," SAE Technical Paper No. 2011-01-0357, 4(1):360-74, Jan. 2011.
Kokjohn wt al., "Fuel reactivity controlled compression ignition (RCCI): a pathway to controlled high-efficiency clean combustion," International Journal of Engine Research, 12(3):209-226, Jun. 2011.
Krummenacher et al., "Catalytic partial oxidation of higher hydrocarbons at millisecond contact times: decane, hexadecane, and diesel fuel," Journal of Catalysis, 215(2):332-343, Apr. 2003.
Leung et al., "Raising the fuel heating value and recovering exhaust heat by on-board oxidative reforming of bioethanol," Energy & Environmental Science, 3(6):780-8, 2010.
Megaritis et al., "Fuel reforming for diesel engines," In Advanced Direct Injection Combustion Engine Technologies and Development: Diesel Engines vol. 2, 543-561. CRC Press., 2010.
Northrop et al., "Combustion phasing effect on cycle efficiency of a diesel engine using advanced gasoline fumigation," In Proceedings of the ASME 2012 Internal Combustion Engine Division Spring Technical Conference, Torino, Italy.
Northrop et al., "Condensational Growth of Particulate Matter from Partially Premixed Low Temperature Combustion of Biodiesel in a Compression Ignition Engine," Aerosol Science and Technology, 45(1):26-36, Jan. 2011.
Northrop et al., "Evaluation of Diesel Oxidation Catalyst Conversion of Hydrocarbons and Particulate Matter from Premixed Low Temperature Combustion of Biodiesel." SAE International Journal of Engines, 4(1):1431-1444, Jan. 2011.
Ohkishi et al., "Diesel smoke reduction by gasoline fumigation using an ultrasonic atomizer." SAE Technical Paper 920691., Jan. 1992.
Panuccio et al., "A Comparison of the Catalytic Partial Oxidation of C1 to C16 Normal Paraffins," AICHE J., 53(1):187-95, Jan. 2007.
Qi and Karan, "Integrated fuel processors for fuel cell application: a review," Fuel Processing Technology 88(1):3-22, Jan. 2007.
Quader al., "Engine Performance and Emissions Near the Dilute Limit with Hydrogen Enrichment Using an On-Board Reforming Strategy Reprinted From: SI Combustion," SAE Technical Paper 2003-01-1356, Mar. 3, 2003.
Raju et al., "Acceleration of Detailed Chemical Kinetics Using Multi-zone Modeling for CFD in Internal Combustion Engine Simulations," SAE Technical Paper 2012-01-0135, Apr. 16, 2012.
Salge et al., "Renewable hydrogen from nonvolatile fuels by reactive flash volatilization," Science, 314(5800):801-4, Nov. 3, 2006.
Seiser et al., "Extinction and autoignition of n-heptane in counterflow configuration," Proceedings of the Combustion Institute 28(2):2029-2037, Jan. 1, 2000.
Splitter et al., "Effect of compression ratio and piston geometry on RCCI load limits and efficiency." SAE Technical Paper No. 2012-01-0383, Apr. 16, 2012.
Splitter et al., "Injection effects in low load RCCI dual-fuel combustion," SAE Technical Paper No. 2012-24/0047, Sep. 11, 2011.
Splitter et al., "Reactivity controlled compression ignition ( RCCI ) heavy-duty engine operation at mid-and high-loads with conventional and alternative fuels." SAE Technical Paper No. 2011-01-0363, Apr. 12, 2011.
Swanson et al., "Alternatives to the gravimetric method for quantification of diesel particulate matter near the lower level of detection," J. Air Waste Management Assoc., 60(10):1177-1191, Oct. 2010.
Szybist et al., "Analysis of the Impact of Selected Fuel Thermochemical Properties." Energy and Fuels, 26(5):2798-810, May 2012.
Tsolakis et al., "Engine performance and emissions of a diesel engine operating on diesel-RME (rapeseed methyl ester) blends with EGR (exhaust gas recirculation)," Energy, 32(11):2072-2080, Nov. 2007.
Tsolakis et al., "Low load dual-fuel compression ignition (CI) engine operation with an on-board reformer and a diesel oxidation catalyst: effects on engine performance and emissions." Energy & Fuels, 24(1):302-308, Oct. 2009.
Wang et al., "Ammonia as hydrogen carrier for transportation; investigation of the ammonia exhaust gas fuel reforming," International Journal of Hydrogen Energy, 38(23):9907-9917, Aug. 2013.
Zheng et al., "An investigation of EGR treatment on the emission and operating characteristics of modern diesel engines," SAE Technical Paper No. 2007-01-1083, Apr. 16, 2007.

\* cited by examiner

ENGINE FUEL-REFORMING REACTORS, SYSTEMS, AND METHODS

CROSS REFERENCE TO RELATED APPLICATIONS

This application is a non-provisional of and claims priority to U.S. Provisional Application No. 62/346,219, filed Jun. 6, 2016. The entire contents of which are hereby incorporated by reference.

TECHNICAL FIELD

This document relates to engine fuel-reforming reactors and systems, as well as methods related thereto.

BACKGROUND

Fuel reformation is the process of changing the chemical composition of a fuel. Reforming can be used to produce syngas (also referred to as synthesis gas), which is a fuel gas mixture containing hydrogen ($H_2$) and carbon monoxide (CO), and sometimes carbon dioxide. Syngas can be purified and used in hydro-processing to upgrade or catalytically convert feedstocks to synthetic fuels, through the Fischer Tropsch process, for example. Industrial reforming can also include converting petroleum feedstocks to other hydrocarbons like olefins that are used in chemical synthesis of polymers. Fuel reforming can also be used to produce a mixture of hydrocarbons and with different fuel properties (e.g., auto-ignition reactivity) than a parent (original) fuel to improve combustion properties. Reactions that occur may during fuel reforming include decomposition, pyrolysis, steam reforming, dehydrogenation, polymerization, and water gas shift. On-board fuel reforming for engines can enable the use of alternative fuels, reduce particulate matter (PM) and nitrogen oxide (NOx) emissions, enable highly dilute combustion, and improve fuel conversion efficiency.

SUMMARY

Disclosed herein are various embodiments of engine fuel reforming reactors, systems, and methods related thereto, for internal combustion engines.

In one implementation, an example engine system for internal combustion and reformation of a fuel includes an engine and a reforming reactor. The engine includes an intake manifold for receiving a first fuel and an exhaust manifold for releasing an exhaust gas. The reforming reactor includes a first end portion, a second end, a wall defining an outer surface and an inner surface. The inner surface defines an interior cavity for receiving the first fuel, a second fuel, reactants for the first fuel, or combinations thereof. The exhaust manifold is sized and shaped for receiving a portion of the reforming reactor such that the exhaust gas flows to and/or along a surface of the reforming reactor located within the exhaust manifold of the engine.

An arrangement of the reforming reactor within the exhaust manifold in the systems described herein facilitates a heat exchange where energy produced from the internal combustion engine provides thermal energy to activate and/or promote a reforming process occurring within the reforming reactor. In some cases, the exhaust gas around the reforming reactor acts as a thermal barrier to heat loss from the reforming reactor. The first fuel may include: a liquid petroleum distillate such as diesel, gasoline or a jet fuel; a liquefied petroleum gas fuel; natural gas; an ether; ammonia; an alcohol; or combinations thereof. In some cases, the system can be a dual-fuel engine system where the engine includes one or more direct injectors for receiving the first fuel, and the reforming reactor includes an inlet at the first end portion for receiving the second fuel. The second fuel may include: a liquid petroleum distillate like diesel, gasoline or jet fuel; a liquefied petroleum gas fuel; natural gas; an ether; ammonia; or an alcohol or mixtures thereof. In some cases, a liquid secondary fuel is vaporized within the reactor using heat contained in the exhaust or externally applied energy in the form of electric power. In some cases, the second fuel can be residual hydrocarbons from engine combustion contained in the exhaust gas. In some cases, the first end portion of the reforming reactor can include one or more openings to allow exhaust gas to enter and flow into the interior chamber of the reactor.

The exterior wall of the reforming reactor can include various structures or surface characteristics configured for increasing the reactor's exterior surface area. In some embodiments, the reforming reactor can include a plurality of fins along the surface adjacent to the reforming reactor. Exterior surfaces of the fins are exposed to the exhaust gas flowing within the exhaust manifold. The fins increase the reactor's surface area, which in turn increases heat exchange between the exhaust gas and the reforming reactor. In some embodiments, the fins can be perforated to allow exhaust gases to pass through. In some embodiments, the fins, or any surface of the reactor, can include non-uniform surface features, such as knurling, or the like, to increase its surface area. Various other types of structures and surface characteristics can be used to achieve increased surface area, such as a honeycomb monolith structure, reticulated foam, pellets, particles, ridges, grooves, protrusions, knurling, or combinations thereof, connected to, located adjacent to, or disposed directly on a reactor wall, in a reactor chamber, or a wall (or structure) adjacent to the reactor.

The exterior surface of the reforming reactor can include a coating to promote a catalytic reaction. For example, in some embodiments, the plurality of fins can include a catalytic coating. The catalytic coating may contain a noble metal comprising one or more of platinum, palladium, rhodium, or combinations thereof. The catalytic coating may contain a base metal catalyst comprising one or more of Cu, Fe, Co, Ni, Cr, Mn, Nd, Ba, Ce, La, Pr, Mg, Ca, Zn, Nb, Zr, Mo, Sn, Ta, and Sr, and combinations thereof.

In some cases, the reforming reactor can include an internal reactor structure (which is also referred to as the catalyst substrate) within at least a portion of the interior chamber. In some cases, the internal reactor structure can include a honeycomb shaped structure. In some cases, the internal reactor structure can include a honeycomb monolith, or a reticulated foam. In some cases, the internal reactor structure can also include the catalyst coating described herein.

In certain implementations, a fuel-reforming reactor contains a conduit body, an inner catalytic support, and a plurality of fins. The conduit body includes a wall structure having inner and outer surfaces. The wall structure defines an interior cavity for the flow of a fluid. The inner catalytic support structure is disposed within the interior cavity of the conduit body. The inner catalytic support structure comprises an endothermic decomposition reaction catalyst or an endothermic reforming reaction catalyst. The plurality of fins are coupled to the outer surface of the conduit body. Each fin extends away from the outer surface, and each fin includes a catalytic coating disposed over an exterior surface of the fins.

In another implementation, a method of reforming a fuel can include introducing one or more fuels into an internal combustion engine; introducing one or more reactants to the reforming reactor provided herein; and directing flow of an exhaust gas exiting from the internal combustion engine along a flow path along the outer surfaces of the reactor. The flow path can transfer thermal energy associated with the exhaust gas indirectly to an endothermic decomposition reaction catalyst or endothermic reforming reaction catalyst of the inner catalytic support structure of the reactor. The flow path transfers thermal energy from the gas and chemical energy produced from an exothermic reaction of unburned fuel from the engine and residual oxygen to the endothermic decomposition reaction catalyst or the endothermic reforming reaction catalyst.

In some cases, the flow path can transfer thermal energy associated with the exhaust gas indirectly to an endothermic decomposition reaction catalyst or endothermic reforming reaction catalyst the reactor by transferring the thermal energy through the wall structure of the reactor disposed between the exhaust gas and the catalyst.

In some implementations, the reforming reactor described herein can provide syngas to the engine intake. In some embodiments, the reforming reactor can provide syngas to a downstream reactor in the exhaust stream such as a selective catalytic reduction reactor, particulate filter or lean nitrogen oxides (NOx) trap.

In certain embodiments, a method of reforming a fuel includes oxidizing unburned hydrocarbons exiting from the engine of the engine system described herein, transferring heat via exhaust gases exiting from the engine to reforming reactor, wherein the oxidizing and transferring heat steps occur simultaneously. The simultaneous steps are important for activating catalysts within the reforming reactor when the engine is in a startup mode or a transient mode. During the startup and transient modes, the exhaust gases exiting the engine are at a low temperature, for example, a temperature below the activation temperature of the catalysts within the reforming reactor. As such, the unburned hydrocarbons initially exiting from the engine will be a higher concentration since the catalysts within the reforming reactor will not have yet been temperature activated. As the temperature of the exhaust gases increase, an oxidation reaction will heat the reformer, generating more syngas, which in turn lowers the unburned hydrocarbons from the engine recycling back to the reactor as part of a feedback loop. This feedback loop is part of the novelty of this design as it solves a crucial problem associated with excessive unburned hydrocarbons and ammonia from dual fuel combustion modes.

Particular embodiments of the subject matter described in this document can be implemented to optionally provide one or more of the following advantages. First, some embodiments provided herein may be configured such that the arrangement of an internal combustion engine and a reforming reactor (which can also be referred to as a reformer) allow for heat exchange to take place between the engine and the reactor, such that energy produced from the engine is used to provide energy indirectly to a reforming process taking place within the reactor. Second, thermal integration of the reformer with the engine systems provided herein can provide the advantage of mitigating heat losses from exothermic reforming reactions or by feeding heat into endothermic reactions. Embodiments of the engine systems provided herein can therefore be advantageous for mitigating heat loss from auto-thermal reforming configurations where exothermic reactions supply the heat for downstream endothermic reactions. Third, some embodiments of the engine systems provided herein include engine systems that use a single fuel, or two fuels, as a method for combusting one or more fuels.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
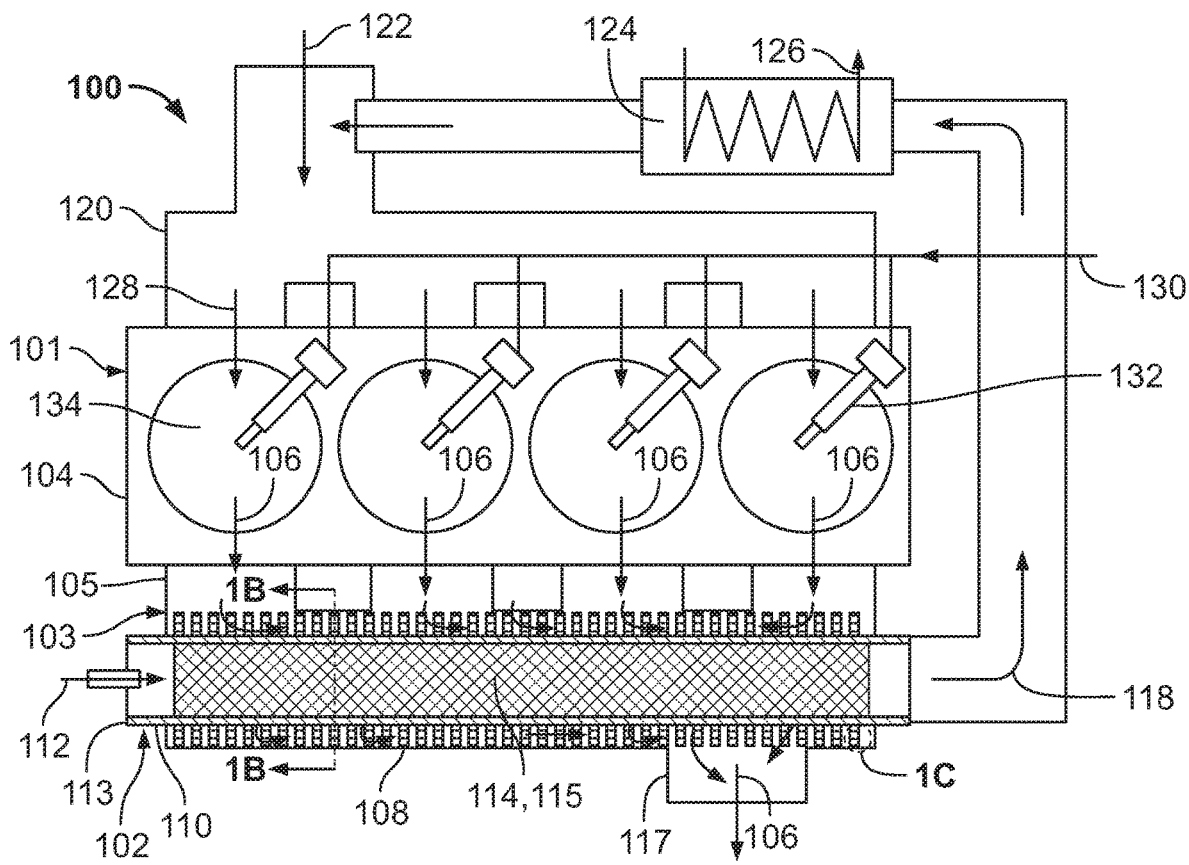
FIGS. 1A-1C are schematic illustrations of a first example of a thermally integrated engine system in accordance with the embodiments disclosed herein.

This document relates to fuel reforming reactors, engine systems, and methods related thereto, for internal combustion engines.

Small-scale reforming can be applicable to internal combustion engine systems provided herein. Certain embodiments of the engine systems described herein can include compression ignition (CI) engines. Pilot-ignited combustion modes can introduce syngas (which can also be referred to as synthesis gas) into an engine intake manifold and use a small diesel pilot injection to control ignition in CI engines. Fox and co-workers reviewed the history of syngas use in diesel engines [1]. The benefits of using diesel engines with syngas can include providing an engine with higher efficiency as compared to using spark ignition engines. Diesel engines that use syngas may be operated with diesel alone, depending on the availability of biomass fuel. Certain embodiments of the engine systems provided herein include engine systems that use single fueling, or dual fueling, as a method for combusting syngas.

Hydrogen alone can be used as a supplemental fuel in CI engines to improve combustion and efficiency. Recent work performed by Guo et al. [2] showed that up to 15% by volume, $H_2$ enrichment of vaporized diesel fuel mixed in the intake of a single-fuel homogeneous charge compression ignition engine (HCCI) can retard combustion due to its higher auto-ignition temperature and allow more stable combustion due to faster oxidation kinetics. $H_2$ use in HCCI [3-5] and $H_2$ enrichment can result in extended ignition delay in HCCI modes [6]. $H_2$ enrichment also can allow for higher compression ratios, thus increasing fuel conversion efficiency. Research [7] has shown that $H_2$ used as the low reactivity fuel in duel fuel reactivity controlled compression ignition (RCCI) can act similarly to gasoline in its effect on ignition delay and enhances premixed combustion. Hydrogen has disadvantages for use in engines however due to its greater tendency for pre-ignition and flashback due to its high flame speed [8].

System-level studies of reforming systems integrated with diesel engines have also been reported as is reviewed by Megaritis and colleagues [9]. Compact fuel processing of hydrocarbon fuels was originally proposed for enabling fuel cell systems to be used on vehicles or in distributed power generation applications with available hydrocarbon fuels [10,11]. Reforming for engines is less complex as there is no requirement to eliminate CO from the syngas stream like in low temperature fuel cells [12]. Most work applying reforming to enhance DI diesel engines has focused on systems using either fresh air in a partial oxidation reactor [13] or incorporating the reforming reactor into the EGR circuit.

Reformed exhaust gas recirculation (REGR) has been studied by Tsolakis and co-workers [14-17]. Non-catalytic methods of partial oxidation have also been proposed for complete conversion of diesel fuel using thermal methods [18] and using plasma-assisted reactors [19]. No previous studies have discussed or suggested the engine systems provided herein for using thermal energy from the recycled exhaust gases for reforming reactions to increase the heating value of the reformed fuel.

Reported benefits of fuel reforming for diesel engines include reductions in PM and NOx emissions [17] and moderate improvements in engine efficiency. Benefits in efficiency mostly result from reduced fuel penalty from after-treatment systems, thermal heat recovery, and exploitation of faster burn rates of hydrogen to improve combustion [20]. Catalyst degradation and transient response are practical concerns for implementation of reforming systems for engines. Although the idea of reforming fuel for engines using exhaust gas thermal recuperation has been studied, thermally integrated reactor designs are novel.

Other embodiments of the engine systems described here can include spark ignition (SI) engines. Supplementing gasoline with H2 in SI engines has benefits for extending ignition timing compared to gasoline only operation, thus reducing NOx emissions [26]. The engine systems described herein can use REGR as a means for reducing combustion instability, lowering particulate matter emissions, and increasing dilution sensitivity when applied to gasoline direct injection (GDI) engines [27]. For SI engines that operate with stoichiometric combustion, REGR systems that use steam and heat contained in the exhaust gas have the potential to recoup energy and improve engine thermal efficiency.

The embodiments provided herein include engine systems in which an engine exhaust oxidation catalyst is coupled with an endothermic reforming reactor in a reactor chamber integrated into the exhaust manifold of an engine. Various embodiments of the systems described herein, thus include catalytic reactors that are not detached from the engine. Thermal integration of the reforming reactor with the engine systems provided herein can provide the advantage of mitigating heat losses from exothermic reforming reactions and for feeding the necessary heat into endothermic reactions. Embodiments of the engine systems provided herein can therefore be advantageous for mitigating heat loss from auto-thermal reforming reactions.

Figure 1B:
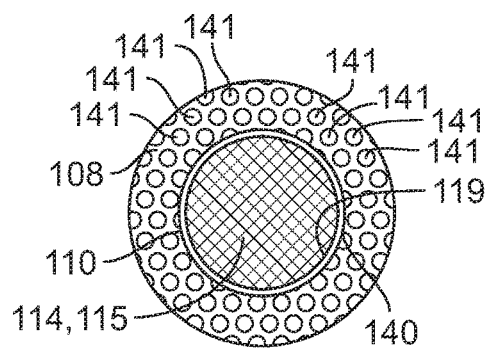
Figure 1C:
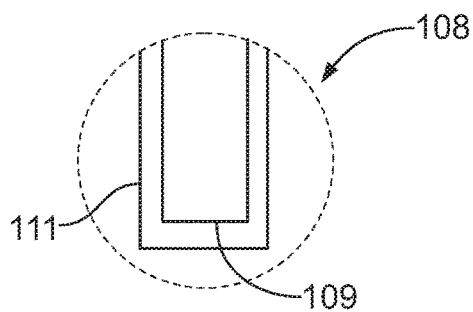

Referring to FIGS. 1A-1C, a first example of a thermally integrated engine system 100 provided herein includes an engine 101, a reforming reactor 102, and a reactor chamber 103. The engine 101 is configured to receive a reformed fuel 118 and can also receive an optional secondary fuel 130, if desired. The engine 101 produces an exhaust gas 106 from the one or more fuels 118, 130. The reforming reactor 102 is configured for receiving and reform an inlet fluid 112 comprising one or more reactants and/or a feed fuel. The reformed fuel 118 exits the reforming reactor 102 and flows to the engine 101. The inlet fluid 112 can include one or more vaporized reactants or fuels.

As shown in FIG. 1A, the reactor chamber 103 is sized and shaped to receive the reforming reactor 102. The reactor chamber houses the reforming reactor 102 as well as direct flow of exhaust gases 106 exiting from the engine 101 to the reactor chamber 102. At least a portion of the reactor chamber 103 is coupled to the housing of the engine 101 so that the reactor chamber 103 is fluidly coupled to one or more outlets of an exhaust manifold 105 of the engine 101. In some cases, the reactor chamber 103 is an integral part of (e.g., an extension of) the exhaust manifold 105 that is sized and shaped to receive the reforming reactor 102. The exhaust gas 106, exiting from the exhaust manifold 105, is fluidly connected to interior portions of the reactor chamber 103 such that the exhaust gas 106 can flow along a surface of the reforming reactor 102. Reformation requires energy that can be provided in the form of thermal energy. Thus, the arrangement of the engine 101, the reactor 102, and reactor chamber 103 allows for an efficient heat exchange to occur between the engine 101 and the reactor 102 via the exhaust gases, such that thermal energy produced from the internal combustion engine 101 can be used to provide energy to promote a reforming reaction (or process) in the reactor 102.

Still referring to FIG. 1A, the engine system 100 promotes thermal exchange to occur between the exhaust gas and the reactor 102 through a reactor wall 140 and includes structures that prevent the exhaust gas 106 from the engine 101 from entering the interior portion of the reactor 102. The exhaust gas 106 from the engine 104 can flow through heat exchange structures, for example, the depicted perforated fins 108, which allow for gaseous cross-flow (e.g., traverse flow) along the body 110 of the reactor 102 before the exhaust gas 106 exits from an outlet end 117 of reactor chamber 103. The exhaust gas 106 can exit the reactor chamber 103 and enter another chamber or portion of the system, such as a turbine portion of a turbocharger or an after-treatment catalyst chamber (not shown here, but discussed with an embodiment shown in FIG. 6).

Still referring to FIG. 1A, the reactants of the inlet fluid 112, which promote fuel reforming, are introduced into the inlet end 113 of the tubular body 110 of the reactor 102. The reactants can be mixed with water (e.g., steam), an alcohol, an ammonia, or mixtures thereof. In some cases, a liquid reactant, for example, a hydrous ethanol (e.g., ethanol mixed with water), can be introduced into the reactor 102. Liquid reactants may be evaporated using an electric vaporizer (not shown), such as a commercially available electric vaporizer, prior to being introduced into the reactor 102. In some cases, the electric vaporizer is integrated in the reactor 102 such that the reactants are evaporated while flowing within the reactor 102. In some cases, gaseous reactants 112, for example, ammonia, can be directly introduced into the inlet 113 of the reactor 102.

Decomposition and steam reforming reactions may occur within an interior cavity 114 of the tubular body 110 of the reactor 102. Since these reactions are endothermic reactions that absorb heat, a catalyst substrate structure 115 (which can also be referred to as a heat exchange media or heat exchange structure) is disposed within the interior cavity 114 of the reactor 102. The catalyst substrate structure 115 is adapted to increase a surface area of the internal area of the reactor 102 exposed to the flowing inlet fluid 112 flowing though the interior cavity 114 of the tubular body 110. In some cases, the catalyst substrate structure 115 can be made of one or more various materials, such as metal, a ceramic, a polymer, or combinations thereof. In some cases, the catalyst support structure 115 can be made of a ceramic material, such as cordierite, mullite, alumina, or combinations thereof. The catalyst substrate structure 115 can be bonded to an inner wall 119 of the reactor 102 using various techniques, such as brazing or welding. Heat is transferred to the reactor 102 in the novel integrated engine-reactor design provided herein by exhaust gas enthalpy and a heat of reaction produced from oxidation of hydrocarbons and carbon monoxide carried in the engine exhaust gas 106.

The catalyst substrate structure 115 can include a metal or metal alloy (e.g., FeCr alloy) honeycomb monolith support. The structure 115 can be brazed to a wall of the reactor 102 that forms a continuous metal joint to provide an added heat transfer benefit. In some cases, the catalyst substrate structure 115 can include an alumina honeycomb monolithic support, as described in U.S. Pat. No. 6,365,259, titled "High strength/high surface area alumina ceramics," which is incorporated in its entirety. The catalyst support structure 115 can define a plurality of cells adapted for providing a high surface area structure while minimizing an overall volume of the support structure 115. In some cases, the catalyst support structure 115 can be formed into one of various shapes, including a rectangular, a cylindrical, or an elliptical shape. Each cell can have one of many various shapes, for example, each cell may be square-shaped, circular, hexagonal, triangular, or the like. Cell structure density of the catalyst support structure 115 can range from about 10 to about 1200 cells per square inch.

Still referring to FIGS. 1A-1C, the reactor fins 108 can include any desired form and size. The reactor fins 108 can be flat, radial extensions that extend generally perpendicular to, or at a desired angle from the exterior of the reactor tubular body 110. A cross-sectional outer perimeter of each fin 108 can be square, circular, rectangular, regular, or irregularly shaped. The heat exchanger fins 108 can be made of metal and/or metal alloys such as cast steel, forged steel, cast iron, and cast aluminum, a ceramic, and combinations thereof. The heat exchanger fins 108 may be coupled to the tubular body 110 of the reactor 102 mechanically (for example, by interference fit, press fit, or use of fasteners). In some cases, the heat exchanger fins 108 may be coupled to the tubular body 110 by heat-joining processes (for example, brazing, soldering, welding, or the like) to optimize the conductive heat transfer potential of the reactor 102.

The reactor fins 108 can include surface characteristics to promote heat exchange between the exhaust gas 106 and the reactor 102. The surface or wall thickness of the fins can be adapted for increasing the surface area of the fin 108. In some cases, each fin 108 can have a non-uniform surface or variable wall thickness. In some cases, the fins 108 include non-flat surface features, such as ridges, grooves, protrusions, knurlings, or combinations thereof. In some cases, the fins 108 include a porous or rough surface.

Referring to FIG. 1B, each fin defines at least one perforation 141 extending in an axial direction from one surface to an opposite surface of a fin. In some cases, the fins 108 include a plurality of apertures. Each aperture can extend from a first face to a second face of the fin 108. In some cases, each aperture can be an elongated slot that extends in a radial direction away from the outer surface of the reforming reactor. In some cases, a portion of each fin, or a portion of the plurality of fins, define two or more aperture shapes (e.g., two, three, four, five, six, seven, eight, nine, ten). For example, in some cases, the first aperture shape can include a circle, and the second aperture shape can include an elongate slot. Alternatively, in some cases, the fins are solid pieces with no perforations or apertures.

As shown in FIG. 1C, the heat exchanger fins 108 can optionally include a catalytic substrate. In some cases, the fins 108 include a coating 111 containing the catalytic substrate. The coating 111 may be disposed on at least a portion of an exterior surface 109 of the fins 108. In some cases, the coating 111 contains an oxidation catalyst. Exemplary oxidation catalysts include a noble metal, such as platinum, palladium, platinum, rhodium, gold, silver, iridium, ruthenium, and a mixture or alloy of two or more thereof. Oxidation catalysts can convert unreacted hydrocarbons flowing from the engine cylinder 134 to generate heat, which in turn, may be used by endothermic reactions occurring within the reforming reactor 102. In some cases, the catalytic coating may contain a base metal catalyst, which can include one or more of Cu, Fe, Co, Ni, Cr, Mn, Nd, Ba, Ce, La, Pr, Mg, Ca, Zn, Nb, Zr, Mo, Sn, Ta, and Sr, and combinations thereof. In some cases, the fins 108 are at least partially made of the catalytic substrate.

The use of an oxidation catalyst on the fins 108 is particularly advantageous for a diesel engine where excess oxygen is available from engine combustion. The use of the catalyst (e.g., oxidation catalyst) can be advantageous as unburned fuel from the engine can be oxidized prior to being emitted by the engine while the heat from the oxidation process may feed endothermic decomposition reactions taking place within the reforming reactor. Traditionally, a method of treating exhaust pollutants includes using a catalytic system. Generally, catalysis in automotive applications is directed to treating HC, CO, and NOx. As such, automotive catalysts are termed a three-way catalyst. In some cases, a three-way catalyst could be coated on the external heat exchange structures 108 for use in a stoichiometric spark-ignited engine. A stoichiometric spark-ignited engine is an engine that consumes all the oxygen in the fuel-air mixture. The stoichiometric mixture for is the ideal ratio of air to fuel that burns all fuel with no excess air. For iso-octane, a surrogate for gasoline fuel, the stoichiometric air-fuel mixture is about 15:1; i.e. for one gram of fuel, 15 grams of air are required. The fuel oxidation reaction is:

$$\frac{25}{2} O_2 + C_8H_{18} \rightarrow 8CO_2 + 9H_2O$$

In some cases, the heat exchange mechanism of the thermally integrated reforming reactor provided herein may be used for gasoline or diesel engines. In some cases, the indirect heat exchange mechanism can be used for steam reformation in either a gasoline engine or a diesel engine.

After flowing over and through the fins 108 on the reactor tube 102, the exhaust gas 116 exits the reactor 102 at the outlet 117. The exhaust gas 116 can flow to a turbine section of a turbocharger, an after-treatment catalyst chamber, or to the environment (e.g., out the system).

Referring to FIG. 1A, reformed fuel 118 exits the reactor 102 and enters the intake manifold 120 of the engine 101. At the intake manifold 120, the reformed fuels 118 are mixed with incoming air 122. The reforming products 118 can optionally be passed through an auxiliary heat exchanger 124 using an engine coolant or a liquid coolant from a separate cooling loop 126. Cooling the products 118 lowers the overall density of the intake mixture 128 entering the engine 101, which helps to increase the volumetric efficiency of the engine 101. In the case of a diesel engine or a direct injection gasoline engine, an optional supplemental fuel 130 (that does not come from the reforming reactor) 102 can be directly injected into the engine cylinder 134 using standard injectors 132. For port fuel injection gasoline engines (not shown in the figure), a fuel, such as liquid gasoline/ethanol, can be injected into the intake manifold 120.

A key advantage of the reactor 102 described herein is the coupling of exothermic oxidation reactions, which are occurring at the external fins 108 of the reactor tube 110, and the endothermic decomposition/steam reforming reactions, which are occurring at the reactor catalyst 115. This coupled configuration is particularly advantageous when incorporated into the engine system 100 as shown in FIG. 1A. Dual fuel engine systems that fumigate a low reactivity fuel (e.g., syngas) into the intake and directly inject the primary fuel typically result in higher unburned hydrocarbon (UHC) or unburned fuel emissions than conventional single fuel configurations. This is especially true for diesel engines where fumigated fuel is often trapped in crevice regions near the top of the piston and sides of the piston. UHC accounts for lost combustion efficiency and must be oxidized using catalysts in the exhaust. The engine system configurations provided herein can both eliminate or reduce UHC and utilize the exothermic oxidation reactions to enhance the steam reforming/decomposition reactions occurring in the reactor 102.

The engine system 100 shown in FIG. 1A can provide advantages for engine conditions where an exhaust temperature is not sufficiently high enough to achieve reforming. In such a situation, the reforming reactor 102 would not normally convert a significant amount of the fuel, so a significant unburned fuel will remain in the engine exhaust. The system 100 described herein can oxidize this unburned fuel, which in turn increases the exotherm and reforming conversion. Furthermore, reformed fuel products, such as H2 and CO, are less likely to escape the engine combustion chamber due to their higher flame speed and thus an equilibrium between reforming catalyst conversion and UHC concentration is expected for a given engine condition.

Figure 2A:
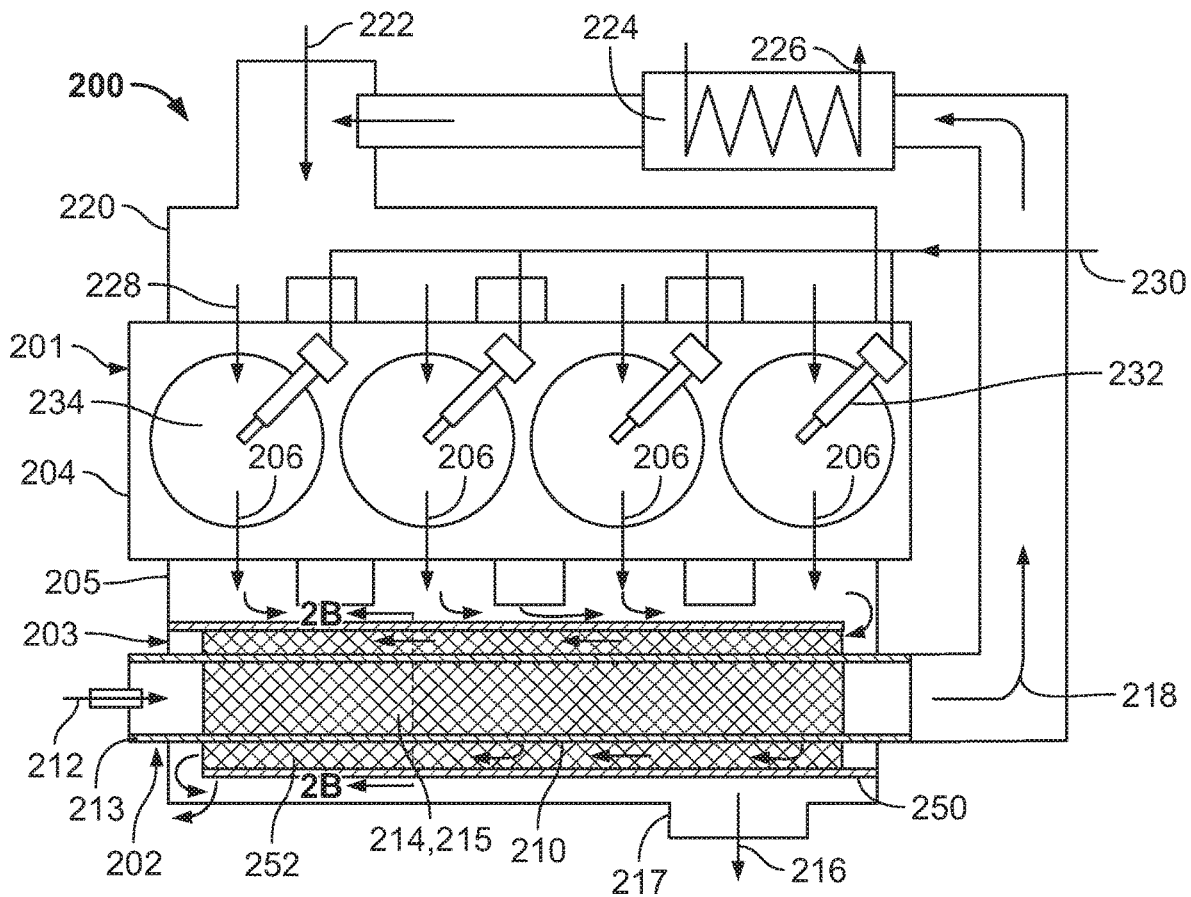
FIGS. 2A and 2B are schematic illustrations of a second example of a thermally integrated engine system.
Figure 2B:
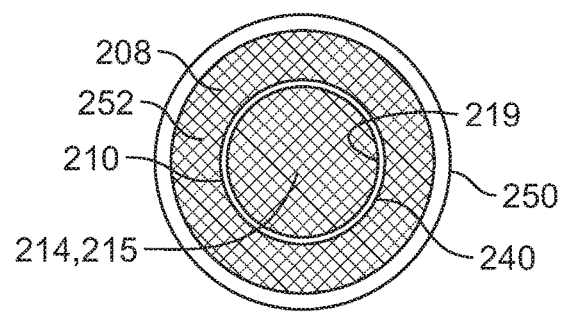

Referring to FIGS. 2A-2B, a second example of a thermally integrated engine system 200 that includes an engine 201, a reforming reactor 202, and a reactor chamber 203. System 200 has many similar features as compared to the previously discussed system 100, with exception of the reforming reactor 202 design. For this reason, the discussion of system 200 primarily focuses on a description of the reactor 202.

The depicted engine 201 is configured to receive a reformed fuel 218 and an optional secondary fuel 230. The engine 201 can produce an exhaust gas 206 from the fuels 218, 230. The reforming reactor 202 can be configured for receiving an inlet fluid 212 comprising one or more reactants and/or a feed fuel to reform and produce the reformed fuel 218 to the engine 201. The inlet fluid 212 can include one or more vaporized reactants or fuels.

As shown in FIG. 2A, the reactor chamber 203 is sized and shaped to receive the reforming reactor 202. At least a portion of the reactor chamber 203 is coupled to the engine 201 such that the reactor chamber 203 is fluidly coupled to one or more outlets of an exhaust manifold 205 of the engine 201. In some cases, the reactor chamber 203 can be a part of (e.g., an extension of) the exhaust manifold 205 that is sized and shaped to receive the reforming reactor 202. The exhaust gas 206, exiting from the exhaust manifold 205, is fluidly connected to portions of the reactor chamber 103 such that the exhaust gas 206 can flow along a surface and an annular region (which will be discussed below) of the reforming reactor 202. Reformation requires energy that can be provided in the form of thermal energy. Thus, the arrangement of the engine 201, the reactor 202, and reactor chamber 203 allows for an efficient heat exchange to occur between the engine 201 and the reactor 202, such that thermal energy produced from the internal combustion engine 201 can be used to provide energy to promote a reforming reaction (or process) in the reactor 202.

The reforming reactor 202 includes the inner portion 210 disposed within the outer portion 250. The inner portion 210 has a tubular body defined by a wall that extends from an inlet end and an outlet end. The inner portion 210 of the reactor 202 defines an interior cavity 214 for reforming a catalyst. The outer portion 250 has a tubular body defined by a wall that extends from an inlet end to an outlet end. An annular region 252 is formed between the inner portion 210 and the outer portion 250. The inner portion 210 and the outer portion 250 are separated by a reactor wall 240. One or more heat exchange structures 215, which are structures that increase the surface area provided in a given region of the reactor 202, are disposed in the annular region 252 to allow passage of the exhaust gas and promote heat transfer between the exhaust gas 218 and the inner portion of the reactor 202.

Referring to FIG. 2A, the engine system 200 defines a structural pathway for the exhaust gas 206 to flow from the engine 201 and through the annular region 252 of the reactor 202, to promote thermal exchange between the engine and the inner portion 210 of the reactor 202 through the reactor wall 240. The thermally integrated reforming reactor 202 is disposed within the reactor chamber 203 and is fluidly connected to the exhaust port 203 of the engine 204. The exhaust gas 206 from the engine 204 flows through the heat exchanger structures 215, disposed within the annular region 252 of the reactor 202 to allow for gaseous cross-flow (e.g., traverse flow) along a portion of the reactor 202 before the exhaust gas 206 exits from an outlet end 217 of reactor chamber 203. The exhaust gas 206 can exit the reactor chamber 203 to another portion of the system, such as a turbine portion of a turbocharger (not shown).

Referring to FIGS. 2A-2B, the inlet fluid 212, previously described herein, is introduced into the inlet end 213 of the inner portion 210 of the reactor 202. Decomposition and steam reforming reactions may occur within the interior cavity 214 of the inner portion 210 of the reactor 102. Since these reactions are endothermic reactions that absorb heat, a catalyst substrate structure 215 is disposed within the interior cavity 214 of the inner portion 210. The catalyst substrate structure 215 is adapted to increase a surface area of the internal area of the reactor 202 exposed to the flowing inlet fluid 212 flowing though the interior cavity 214 of the inner portion 210.

As shown in FIGS. 2A-2B, the heat exchange structure 208 is disposed in the annular region 252 of the reactor 202. The heat exchange structure 208 can include structures, such as a monolith material, that allow passage of the exhaust gas and promotes heat to transfer from the exhaust gas 218 to the inner portion of the reactor 202.

The heat exchange structure 208 and/or the catalyst substrate structure 215 can be made of one or more various materials, such as metal, a ceramic, a polymer, or combinations thereof. In some cases, heat exchange structure 208 and/or the catalyst substrate structure 215 are made of the same material and/or structures. In some cases, the heat exchange structure 208 and/or the catalyst support structure 215 can be made of a ceramic material, such as cordierite, mullite, alumina, or combinations thereof. The structures 208, 215 can be bonded to a portion of the reactor 202 using various techniques, such as brazing or welding. Heat is transferred to the reactor 202 in the novel integrated engine-reactor design provided herein (as shown in FIG. 1A) by exhaust gas enthalpy and a heat of reaction produced from oxidation of hydrocarbons and carbon monoxide carried in the engine exhaust gas 206. In some cases, the structures 208, 215 can include an alumina honeycomb monolithic support. The structures 208, 215 can define a plurality of cells or pores adapted for providing a high surface area structure while minimizing an overall volume of each structure 208, 215. In some cases, the structures 208, 215 can be formed into one of various shapes, including a rectangular, a cylindrical, or an elliptical shape. Each cell can have one of many various shapes, for example, each cell may be square-shaped, circular, hexagonal, triangular, or the like. Cell structure density of the structures 208, 215 can range from about 10 to about 1200 cells per square inch.

Any of the surfaces of the reforming reactor 202 can include a coating to promote a catalytic reaction. For example, surfaces of the inner portion 210 or the outer portion 250, or surfaces of the heat exchange structure 208 and/or the catalyst substrate structure 215 can optionally include any one of the catalytic coatings previously discussed herein.

Figure 3A:
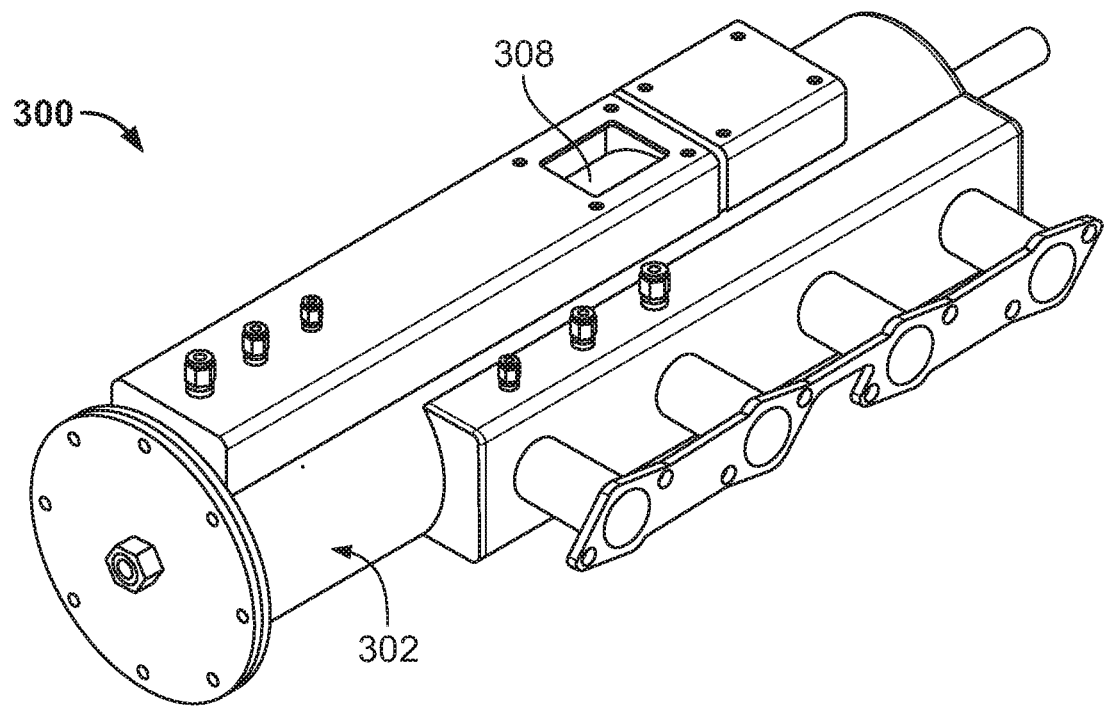
FIGS. 3A-3D are perspective views of an example exhaust manifold.
Figure 3B:
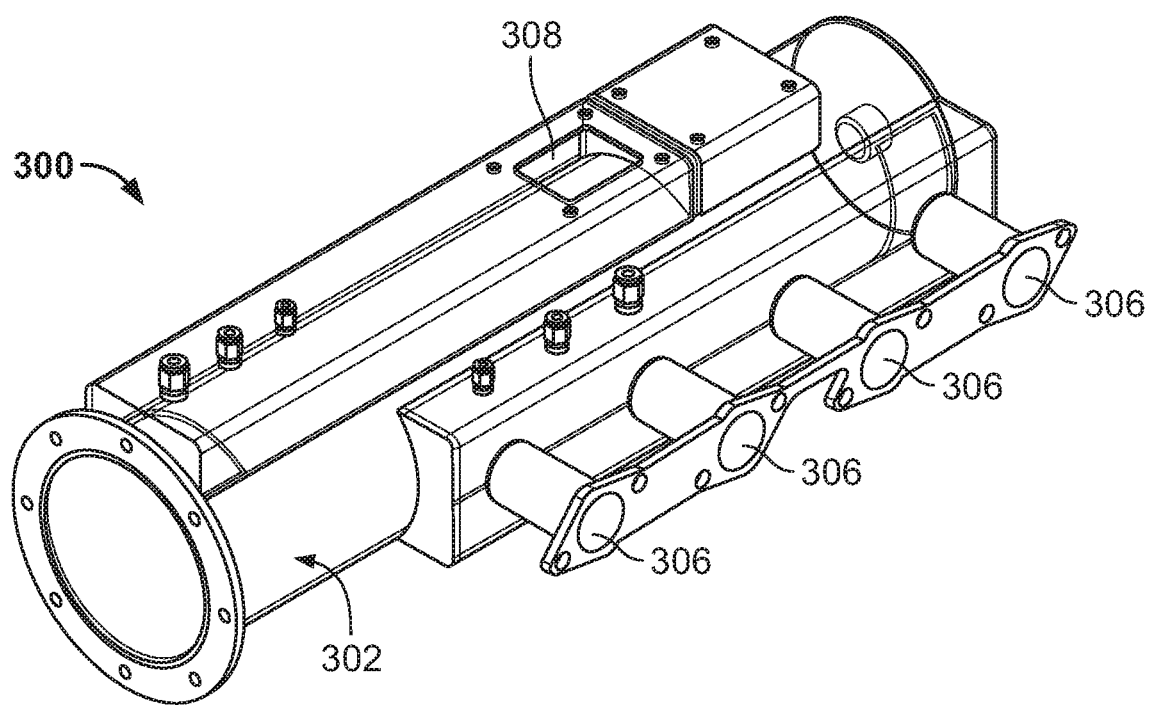
Figure 3C:
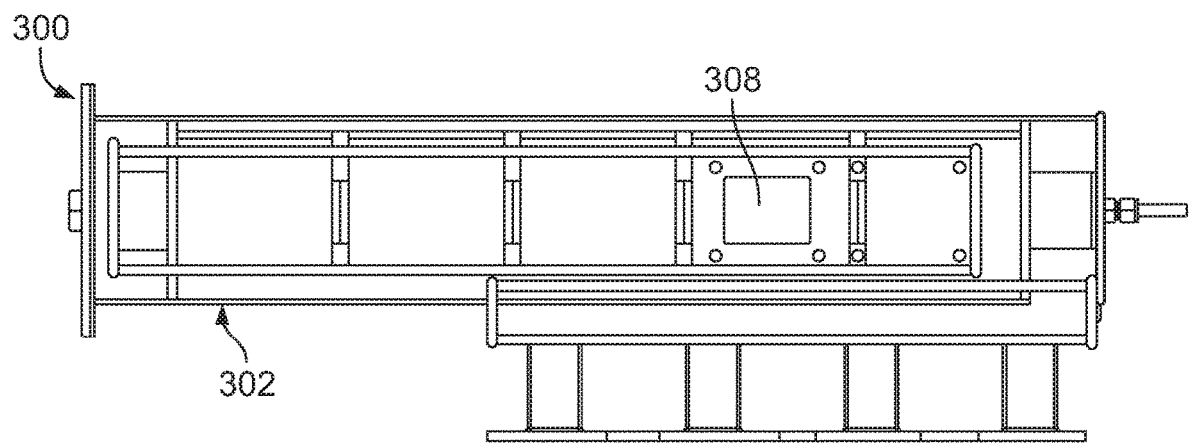
Figure 3D:
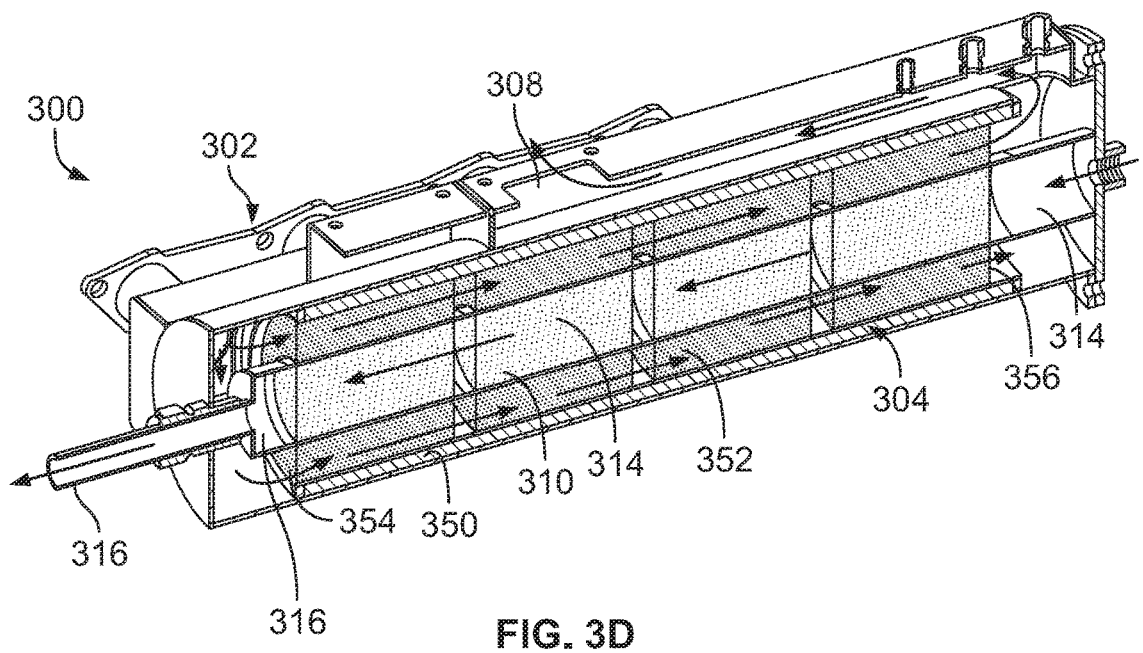

Referring to FIGS. 3A-3D, an example exhaust manifold assembly 300 includes an exhaust manifold housing 302 and a reforming reactor 304. FIGS. 3A and 3B show front perspective views of the exhaust manifold assembly 300, in which FIG. 3B shows some visibility of the interior portions of the assembly 300. FIG. 3C shows a plan view of the assembly 300. FIG. 3D shows a cross-sectional perspective view of the exhaust manifold assembly 300. The exhaust manifold housing 302 includes four inlets 306 for receiving exhaust gas from a four-cylinder engine and one outlet 308 for delivering the exhaust gas out of the exhaust manifold assembly 300. As best depicted in FIG. 3D, the exhaust manifold assembly 300 is sized and shaped for receiving the reforming reactor 304.

Referring to FIG. 3D, the reforming reactor 304 includes the inner tube 310 disposed within the outer tube 350. The inner tube 310 has a body defined by a wall that extends from an inlet end 314 and an outlet end 316. The inner tube 310 of the reactor 304 defines an interior cavity 314 for reforming a catalyst. The inlet end portion 314 does not include any openings for the exhaust gas to enter and flow into the interior 318 of the reactor 304.

The outer tube 350 has a body defined by a wall that extends from an inlet end 354 to an outlet end 356. An annular region 352 is formed between the inner tube 310 and the outer tube 350. Both the annular region 352 includes a heat exchange structure that allows passage of the exhaust gas and promotes heat transfer between the exhaust gas and the inner portion 310 of the reactor 302. In some embodiments, the outer tube 350 can include an outer wall comprising an insulating material that minimizes undesired heat loss. In some cases, selective portions (e.g., wall facing the exhaust outlet) outer tube 350 are insulated, while other portions of the outer tube 350 (e.g., wall between the outer and inner tubes) are not insulated.

Still referring to FIG. 3D, the reforming reactor 304 has a generally tubular body 310 that extends in a direction relatively perpendicular to the inlets 306 such that exhaust gas can be directed towards an annular region 352 of the reactor 304 for heat exchange. The inlet end 354 and an outlet end portion 356 of the outer tube 350 are located at opposite ends relative to the inlet end 314 and the outlet end portion 316 of the inner tube 310, respectively, to allow for maximum heat exchange between the exhaust gas and the inner tube 310 of the reactor 304. The space between the outer portion 350 and the inner portion 310 defines the annular region 318.

Figure 4:
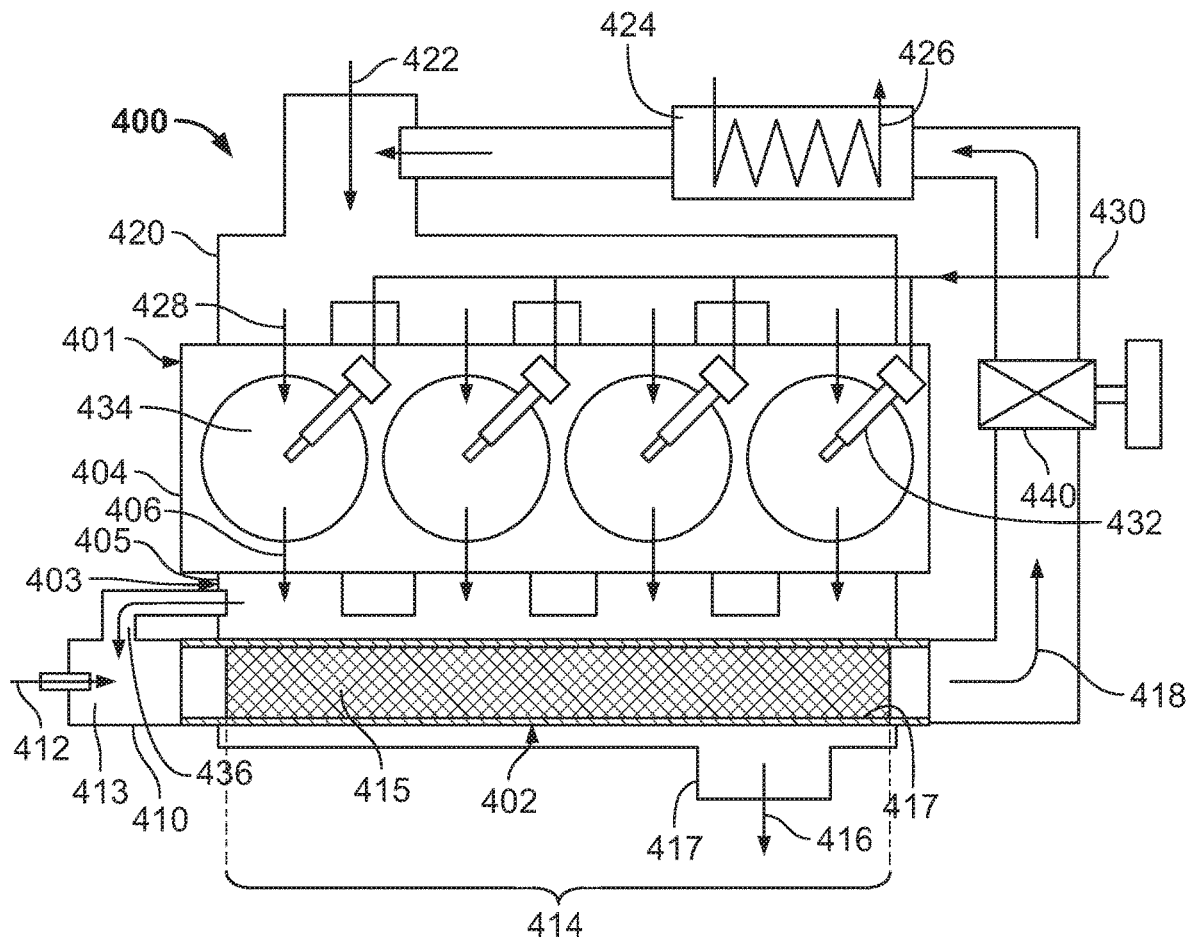
FIG. 4 is a schematic illustration of a third example of a thermally integrated engine system provided herein.

Referring to FIG. 4, a third example of a thermally integrated engine system 400 provided herein includes an engine 401, a reforming reactor 402, and a reactor chamber 403 configured for reformed exhaust gas recirculation. The engine 401 can be configured for receiving a reformed product 418 (or reformed fuel) and an optional additional fuel 430. The engine 401 can produce an exhaust gas 406 from the inputted fuels and/or products 418, 430. The reforming reactor 402 can be configured for receiving reactants 412 (or a fuel) for reformation and delivering the reformed fuel 418 to the engine. The depicted reactor chamber 403 of FIG. 4 is sized and shaped to receive the reforming reactor 402. At least a portion of the reactor chamber 403 can be coupled directly to the engine 401, for example, the reactor chamber 403 can be directly coupled to an exhaust manifold 405 of the engine 401. The exhaust gas 406, exiting from the exhaust manifold 405, is fluidly connected to an interior cavity of the reactor chamber 403 such that one portion of the exhaust gas can both flow into the reforming reactor 402 while another portion of the exhaust gas can flow along exterior surfaces of the reforming reactor 402. Reformation requires energy, which can be provided in the form of heat. Thus, the arrangement of the engine 401, the reactor 402, and reactor chamber 403 can allow for heat exchange to take place between the engine 401 and the reactor 402, such that energy produced from the internal combustion engine 401 can be used to provide energy both directly and indirectly to the reforming process within the reactor 402. In various embodiments, the reactor chamber is a part of the exhaust manifold 405, for example, an extension of the exhaust manifold 405.

In various embodiments, the thermally integrated reactor depicted in FIG. 4 may be used for reforming heavier fuels like gasoline or diesel by mixing exhaust gas with the fuel prior to the reforming catalyst. Such heavier fuels cannot be steam reformed at engine exhaust temperatures and require oxygen to partially oxidize them. If used in a reformed exhaust gas recirculation (REGR) strategy, the reactor design can incorporate a mixing chamber 435 within the reactor 402 where exhaust gas 406 would mix with the incoming vaporized fuel stream 436 before entering the reforming catalyst section 414. In some cases, external fins (see, e.g., fins 108 of FIG. 1) coated with oxidation or three-way catalyst may be optionally brazed onto the reactor tube of the FIG. 4.

The engine systems provided herein can be used in a diesel engine, wherein the exhaust will contain oxygen along with combustion products. Oxygen, carbon monoxide and water in the exhaust help to reform the fuel over the catalyst. When oxygen is supplied to the catalyst, the reforming reaction is either exothermic or autothermal, meaning that endothermic and exothermic reactions are balanced and no net heat is released from the reactor. The thermally integrated engine systems 100, 200 provided herein can mitigate heat losses from the reactor by blanketing the exterior surfaces of the reactor 202 with hot engine exhaust.

In some cases, the engine systems provided herein can be used in a spark ignition engine that runs with stoichiometric combustion, in which no oxygen is present in the exhaust and the REGR reaction will be net endothermic with steam reforming and CO2 (dry) reforming as the primary reactions.

In the REGR configuration, the reactor could use a valve 240 to control the flow of recirculated exhaust through the reactor. Overall reactor stoichiometry is balanced with the control valve and the vaporized reactor fuel input flow. For diesel or lean-burn gasoline applications, it is important to maintain fuel-rich oxygen to fuel stoichiometry to avoid thermal runaway of the catalytic reactor.

Figure 5A:
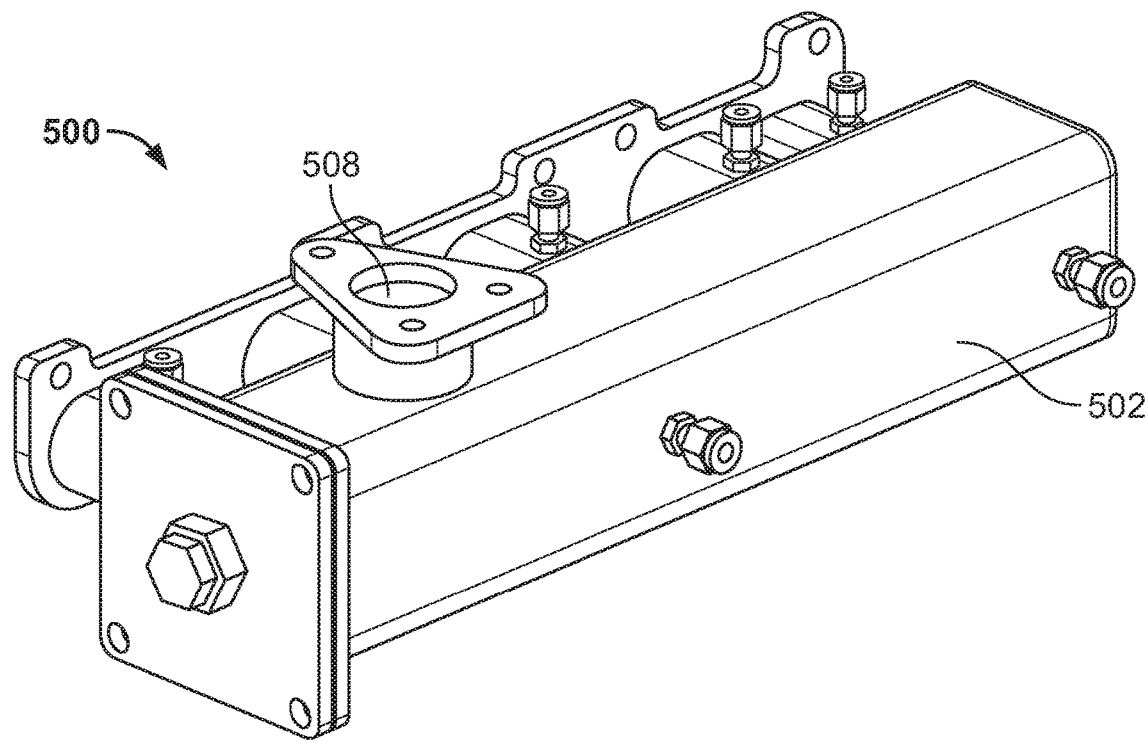
FIGS. 5A-5D are perspective views of another example exhaust manifold.
Figure 5B:
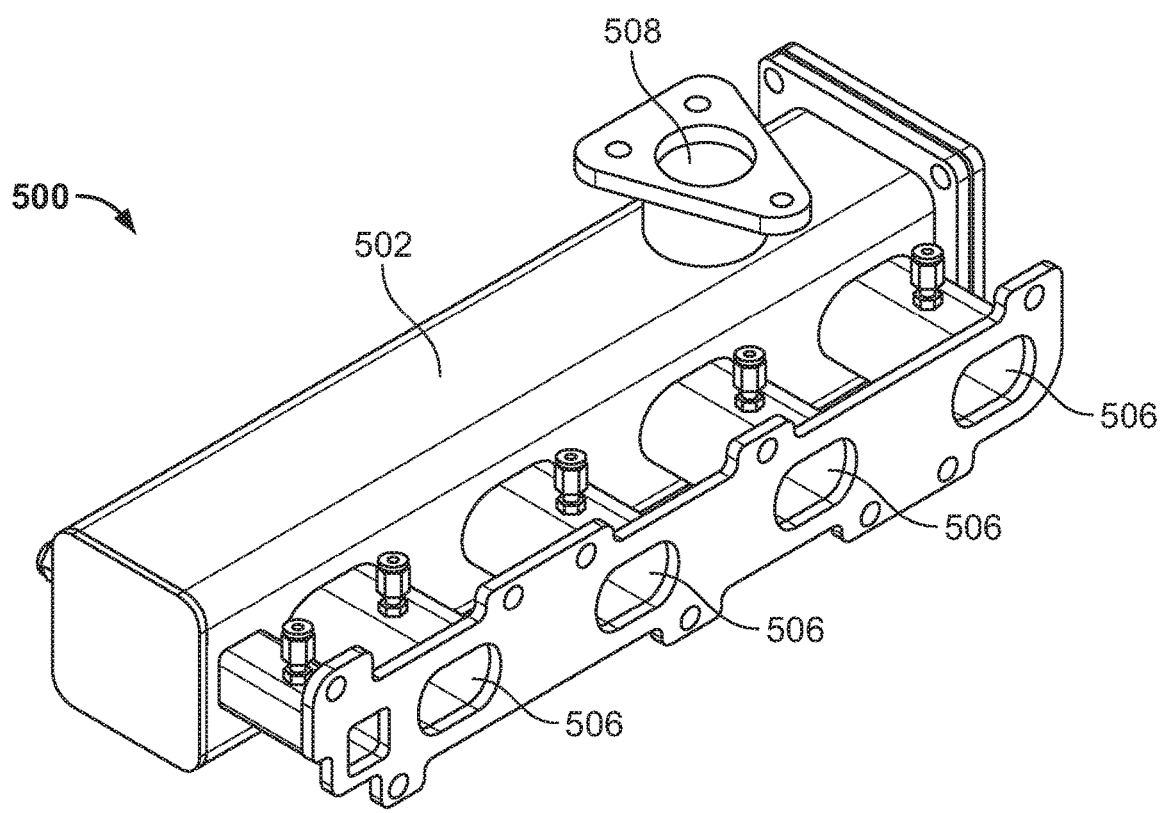
Figure 5C:
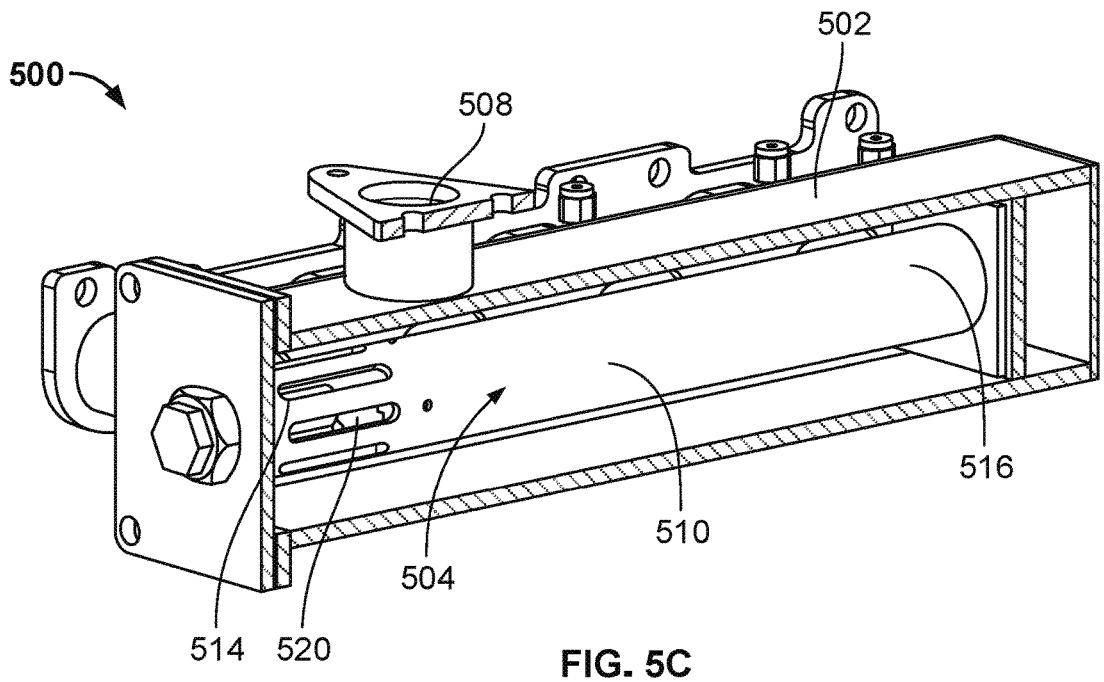
Figure 5D:
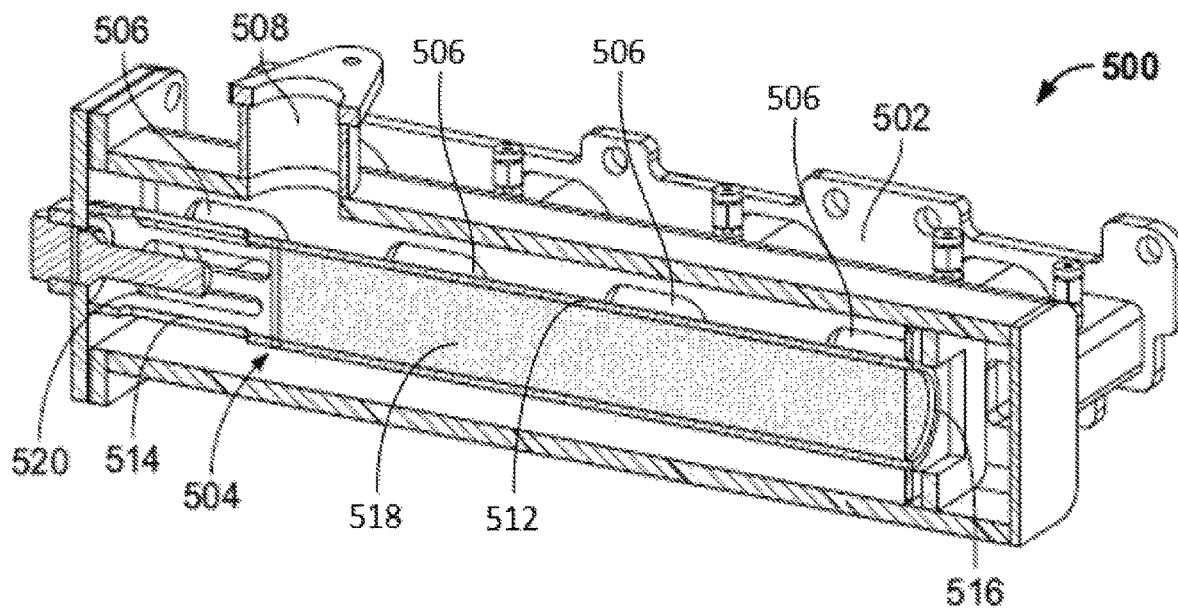

Referring to FIGS. 5A-5D, an exemplary exhaust manifold assembly provided 500 herein includes an exhaust manifold housing 502 and a reforming reactor 504. FIGS. 5A and 5B show front and rear perspective views of the exhaust manifold assembly 500. FIG. 5C shows a perspective view showing an interior portion of the exhaust manifold assembly 500. FIG. 5D shows a cross-section perspective view of exhaust manifold assembly 500. The exhaust manifold housing 502 includes four inlets 506 for receiving exhaust gas from a four-cylinder engine and one outlet 508 for delivering the exhaust gas out of the exhaust manifold assembly 500. As depicted, the exhaust manifold assembly 500 is sized and shaped for receiving the reforming reactor 504.

Referring to FIGS. 5D and 5D, the reforming reactor 504 includes a tubular body 510 that extends in a direction relatively perpendicular to the inlets 506 such that exhaust gas can be directed towards exterior walls 512 of the reactor 504 for heat exchange. The tubular body 510 of the reforming reactor 504 can include an inlet end portion 514 and an outlet end portion 516, and defines an interior cavity 518 therethrough. The inlet end portion 514 may include one or more openings 520 to allow exhaust gas to enter and flow into the interior cavity 518 of the reactor 504. The interior cavity 518 includes a reforming catalyst structure, for example, a metal monolith substrate brazed to the inside of the tubular body 510. As depicted, in some cases, the inlet end portion 514 includes a plurality of elongated openings 520 that extend in an axial direction. In some cases, the inlet end portion 514 can include up to twenty openings 520 (e.g., one, two, three, four, five, ten, fifteen, or twenty openings). Each opening can 520 be shaped to optimize fluid flow, or in some cases, to promote mixing of fluids entering the reactor 504. Exemplary opening shapes can include circular, slots, any polygonal shape, regular shape, or an irregular shape. The outlet end portion 516 of the reforming reactor 504 can be coupled to an exit line of the exhaust manifold assembly 500 such that the reactor products can be delivered to an intake manifold (not shown).

Figure 6:
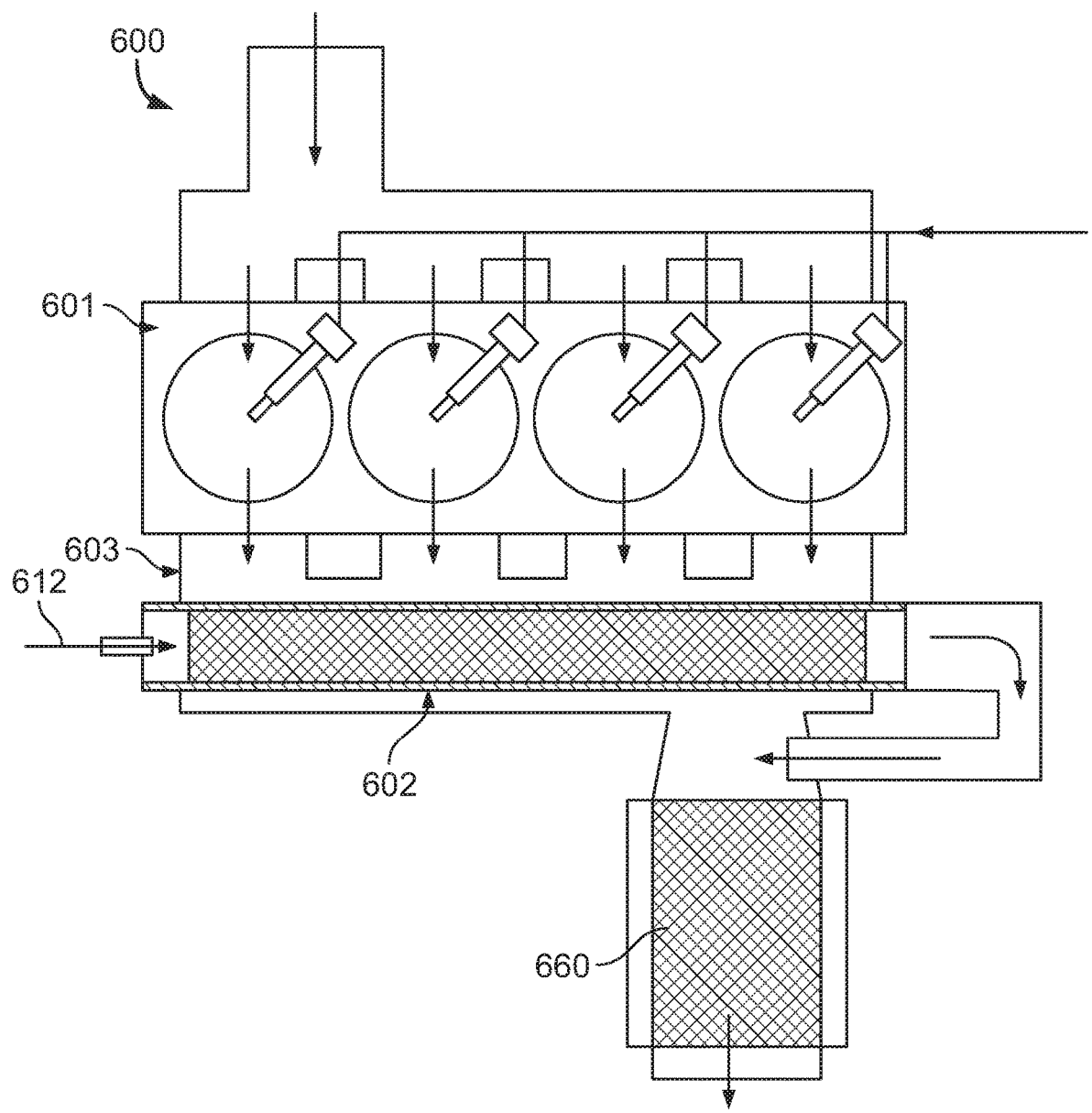
FIG. 6 is a schematic illustration of a fourth example of a thermally integrated engine system provided herein.

Referring to FIG. 6, a fourth example of a thermally integrated engine system 600 provided herein includes an engine 601, a reforming reactor 602, and a reactor chamber 603 configured for reformed exhaust gas recirculation. This system 600 includes many similar features and components as the previously discussed system 400 shown in FIG. 4. The system 600, however, includes structures for directing the reformed fuel exiting the reforming reactor 202 to an after-treatment chamber 660 rather than recirculating the reformed fuel back to the engine 601. The system 600 allows for the beneficial use of reformed products in after-treatment catalyst reactions, such as selective catalytic reduction of NOx, or for regeneration of diesel particulate filters.

Aftertreatment for NOx selective catalytic reduction (SCR) includes a catalytic reactor with injection of a reductant material into the inlet exhaust stream. Hydrogen can increase the selective reduction of NOx when using gaseous hydrocarbons as the reductant [23,24]. The envisioned reforming reactor described herein can be used to supply both hydrogen and gaseous hydrocarbons suitable for NOx SCR. Suitable active materials for reformed gas NOx SCR include silver on alumina support.

Diesel particulate filter (DPF) aftertreatment systems trap particles on a substrate until they are regenerated periodically through injection of a fuel into the exhaust to oxidize the trapped particles. Hydrogen-rich gases like those produced by reforming methods described herein can be used to regenerate DPF substrates at relatively low temperature compared to unburned diesel fuel [25].

Exemplary engine systems provided herein can include a thermally integrated diesel engine system that is configured for reforming hydrous ethanol. For example, the engine systems described herein can include an engine exhaust manifold designed to house a catalytic reactor. The engine exhaust manifold design allows the reactor to be thermally integrated with the exhaust. Catalyst materials for ethanol reforming will be coated onto a metallic substrate that enhances heat transfer between the exhaust gas and the catalyst. An ethanol reforming reaction is endothermic (i.e., requires heat) to convert ethanol and water into reformed products, which includes hydrogen, carbon monoxide, partially oxidized hydrocarbons, and residual ethanol. Since the ethanol reforming reaction is endothermic, the temperature of the exhaust going to the turbocharger will be reduced, potentially reducing the power output of the engine.

Certain embodiments of the engine systems described herein may be used for a dual-fuel hydrous ethanol injection system. In some cases, for example, the engine system can be incorporated into and used on presently commercially available diesel engines. Advantages of using the engine system in such an application can include reducing the use of other sources of energy (e.g., diesel fuels, and natural gas) and resources (e.g., water), and reduce pollutant emissions from existing energy sources (e.g., emissions from diesel engines). For example, in certain applications, the engine system provided herein can replace up to 40% diesel fuel use by energy with ethanol. Ethanol-based systems can help reduce the use of other sources of energy and resources. For example, 180 proof hydrous ethanol production can save 10% in plant natural gas usage and reduce net plant water use up to 6%. In some cases, dual fuel systems may provide an alternative to add-on catalytic after-treatment systems for off-highway engines to reduce, for example, emissions of harmful NOX emissions.

The thermally integrated engine systems described herein can use exhaust heat to reform hydrous ethanol into a mixture of hydrogen and carbon monoxide to reduce combustion temperatures and thus reduce NOx formation in the engine. Hydrous ethanol use in diesel engines can expand the market for ethanol fuel products, lower fuel costs for diesel engine operators, reduce emissions from diesel engine combustion, and improve the efficiency and cost of ethanol production In some applications, the engine systems described herein can catalytically decompose some of the ammonia ($NH_3$) into hydrogen ($H_2$) and nitrogen ($N_2$) prior to introducing the ammonia-hydrogen-nitrogen mixture into an engine intake manifold. For example, ammonia can be supplied into the engine system at a desired pressure from a liquid source and flow into the catalytic reforming reactor in a portion of the exhaust manifold of a multi-cylinder diesel engine. The reforming reactor within the engine system can decompose ammonia into $H_2$, $N_2$ and unconverted $NH_3$. To add necessary excess heat for ammonia decomposition, additional oxygen can be added to the system from air and/or from an exhaust gas recirculation. The engine system can provide the benefit of converting ammonia into a useable fuel for dual-fuel diesel engine operation, as well as efficiently combusting ammonia when it is used as a secondary fuel in dual-fuel diesel engines.

In some cases, the engine systems provided herein can include an optional catalyst (e.g., an oxidation catalyst) on at least a portion of the exterior surface of the reforming reactor. In some cases, a plurality of catalyst-coated fins are disposed on the exterior surface of the reforming reactor. The use of the catalyst (e.g., oxidation catalyst) can be advantageous as unburned ammonia from the engine can be oxidized prior to being emitted by the engine while the heat from the oxidation process feeds the endothermic ammonia decomposition reactions within the reforming reactor. The engine system provided herein can include different types of catalysts described herein and support structures provided herein for optimal conversion of $NH_3$ using the engine system that includes the thermally integrated catalytic reforming reactor.

The compact catalytic decomposition reactor, in some embodiments, can use exhaust heat provided by the exhaust gas to convert ammonia to a mixture of hydrogen, ammonia and nitrogen. The ammonia-based fuel composition can be injected into the intake manifold of the engine system, while diesel is directly injected as an ignition source. The mixture can provide a gaseous fuel that has higher flame speed than ammonia alone. Some embodiments of the novel thermally integrated engine system 500 can thus reduce soot emissions from the engine to below 0.15 g/kW per hour, and/or can achieve 50% by energy diesel fuel replacement by using ammonia in a dual-fuel operating mode. The engine system provided herein may release lower levels of ammonia emissions, as compared to engine systems that do not decompose ammonia. The ammonia-based fuel may also improve combustion efficiency at low engine loads (for example, loads ranging from 1 to 4 bar brake mean effective pressure (BMEP)) and high speeds (for example, speeds ranging from 3000 to 6000 revolutions per minute). Advantages of decomposing ammonia prior to injecting into an engine include providing a sufficient flame speed for a full combustion reaction at relevant timescales when the ammonia-based composition is injected into the engine.

In some cases, dual-fuel diesel operation can inject a low reactivity fuel (like gasoline, ethanol or natural gas) into the intake plumbing in a process called fumigation, and direct injection of diesel fuel into the engine cylinder as illustrated in FIG. 5B. When combined with optimized diesel injection timing and control, low temperature combustion modes can be enabled with two fuels where simultaneously low engine-out soot and nitrogen oxides (NOx) emissions can be achieved through precise combustion control. The dual fuel systems provided herein can therefore provide an alternative engine system as a diesel fuel replacement with cleaner burning fuels like ethanol or compressed natural gas.

The dual fuel system provided herein may have a fumigant energy fraction (FEF), defined as the ratio of fumigant energy based on lower heating value over the total fuel energy, of approximately 35%. Some embodiments of the dual fuel system provided herein can expand FEF to 50% using 190 proof (95% by volume) hydrous ethanol as the fumigant. The systems provided herein may not alter the diesel fuel injection parameters, but instead can independently control the amount of fumigant injection based on measured engine speed, load and intake manifold pressure. The dual fuel systems provided herein can reduce soot emissions from the engine for a given engine load through reduction of fuel rich zones in the combustion chamber.

Ammonia can be used as a combusted fuel and may be used as an engine fuel in place of gasoline in spark-ignited engines, as described in the incorporated references [21,22] provided herein. As shown in Table 1, ammonia has a high research octane number (RON) and a very low laminar flame speed (LFS) compared to gasoline. The RON is a measure of likelihood of fuel auto-ignition in an engine and is inversely proportional to fuel reactivity. Low reactivity fuels (i.e., high octane) are ideally suited as fumigants in dual fuel diesel engines. LFS is a measure of how quickly a fuel and air mixture burns and relates to how quickly a fuel will burn in an engine with limited residence time in the cylinder. Ammonia has extremely low LFS that makes it likely to impede combustion in dual fuel diesel operation.

|  | Laminar Flame Speed in Air (cm/s) | Research Octane Number (RON) |
| --- | --- | --- |
| Ammonia | 8 [9] | 120 |
| Hydrogen | >300 | >130 |
| Gasoline | 35[10] | 85-95 |
| Ethanol | 40[10] | 109 |
| Diesel | — | 15-25 |

A sufficient decomposition of ammonia to H2 and N2 can be achieved with the thermally integrated catalytic reactor, allowing high FEF and low soot emissions from a dual-fuel (ammonia/diesel) engine systems provided herein, while mitigating unburned tailpipe ammonia emissions.

It should be understood that one or more design features of the engine systems and components provided herein can be combined with other features of other engine systems and components provided herein. In effect, hybrid designs that combine various features from two or more of the device designs provided herein can be created, and are within the scope of this disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In various embodiments, the system and method embodiments provided herein are not limited to only systems and methods relating to ammonia or ethanol fuels reformation and/or systems and methods that allow for ammonia or ethanol fuel injections into the engine system. Certain embodiments provided herein can be used to reform various types of alcohols (e.g., methanol, butanol, and the like), natural gas, hydrocarbons (e.g., propane), and/or biofuels (e.g., biodiesel, di-methyl ether and di-ethyl ether). In some embodiments, any one of the systems and methods provided herein may be used for processing liquid petroleum distillates like gasoline, diesel fuels, and/or jet fuels.

In addition to being directed to the teachings described above and claimed below, devices and/or methods having different combinations of the features described above and claimed below are contemplated. As such, the description is also directed to other devices and/or methods having any other possible combination of the dependent features claimed below.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein. All references, publications, and patents referred to herein, including the figures and drawings included therewith, are incorporated by reference in their entirety.

LIST OF REFERENCES

[1] Fox, M. K, G. K. Lilik, A. L Boehman, and O. Le Corre. 2010. Combustion Syngas in Internal Combustion Engines. In Synthesis Gas Combustion: Fundamentals and Applications, 289-328.

[2] Guo, H., V. Hosseini, W. S. Neill, W. L. Chippior, and C. E. Dumitrescu. 2011. "An experimental study on the effect of hydrogen enrichment on diesel fueled HCCI combustion." International Journal of Hydrogen Energy 36 (21). doi:10.1016/j.ijhydene.2011.07.143.

[3] Bika, A. S., L. Franklin, and D. B. Kittelson. 2012. "Homogeneous charge compression ignition engine operating on synthesis gas." International Journal of Hydrogen Energy 37 (11), 9402-9411. doi:10.1016/j.ijhydene.2012.03.014.

[4] Bika, A. S., L. Franklin, and D. B. Kittelson. 2011. "Cycle efficiency and gaseous emissions from a diesel engine assisted with varying proportions of hydrogen and carbon monoxide (synthesis gas)." SAE Technical Paper 2011-01-1194. doi:10.4271/2011-01-1194

[5] Bika, A. S., L. Franklin, H. Acevedo, and D. B. Kittelson. 2011. "Hydrogen-fueled homogeneous charge compression ignition engine." SAE Technical Paper 2011-01-0672. doi:10.4271/2011-01-0672.

[6] Hosseini, V. and M. D. Checkel. 2007. "Effect of reformer gas on HCCI combustion—part II: low octane fuels." SAE Technical Paper 2007-01-0206. doi:10.4271/2007-01-0206.

[7] Fang, W., Huang, B., Kittelson, D. B. & Northrop, W. F. (2014) Dual-Fuel Diesel Engine Combustion with Hydrogen, Gasoline, and Ethanol as Fumigants: Effect of Diesel Injection Timing. J. Eng. Gas Turbines Power 136(8), 081502-1-7.

[8] Homan, H., P. deBoer, and W. McLean. 1978. "The effect of fuel injection on NOx emissions and undesirable combustion for hydrogen-fueled piston engines," SAE Technical Paper 780945. doi:10.4271/780945.

[9] Megaritis, A., M. L. Wyszynski, and S. E. Golunski. 2010. Fuel reforming for diesel engines. In Advanced Direct Injection Combustion Engine Technologies and Development: Diesel Engines Volume 2, 543-561. CRC Press.

[10] Ahmed, S., and M. Krumpelt. 2001. "Hydrogen from hydrocarbon fuels for fuel cells." International Journal of Hydrogen Energy 26 (4), 291-301. doi:10.1016/S0360-3199 (00)00097-5.

[11] Qi, A., B. Peppley, and K. Karan. 2007. "Integrated fuel processors for fuel cell application: a review." Fuel Processing Technology 88, 3-22.

Laramie, J., and A. Dicks. 2000. Fuel Cell Systems Explained. John Wiley and Sons, West Sussex, England.

[12] Conte, E., and K. Boulouchos. 2006. "Experimental investigation into the effect of reformer gas addition on flame speed and flame front propagation in premixed, homogeneous charge gasoline engines." Combustion and Flame 146, 329-347. doi:10.1016/j.combustflame.2006.03.001.

[13] Abu-Jrai, A., J. Rodríguez-Fernández, A. Tsolakis, A. Megaritis, K. Theinnoi, R. F. Cracknell, and R. H. Clark. 2009. "Performance, combustion and emissions of a diesel engine operated with reformed EGR. Comparison of diesel and GTL fuelling." Fuel 88 (6), 1031-1041. doi:10.1016/j.fuel.2008.12.001.

[14] Tsolakis, A., A. Megaritis, M. Wyszynski, and K. Theinnoi. 2007. "Engine performance and emissions of a diesel engine operating on diesel-RME (rapeseed methyl ester) blends with EGR (exhaust gas recirculation)." Energy 32 (11), 2072-2080. doi: 10.1016/j.energy.2007.05.016.

[15] Tsolakis, A., R. Torbati, A. Megaritis, and A. Abu-Jrai. 2010. "Low-load dual-fuel compression ignition (CI) engine operation with an on-board reformer and a diesel oxidation catalyst: effects on engine performance and emissions." Energy & Fuels 24 (1), 302-308. doi:10.1021/ef900796p.

[16] Elghawi, U., K. Theinnoi, S. Sitshebo, A. Tsolakis, M. Wyszynski, H. Xu, R. Cracknell, R. Clark, and A. Mayouf. 2008. "GC-MS determination of low hydrocarbon species (C1-C6) from a diesel partial oxidation reformer." International Journal of Hydrogen Energy 33 (23), 7074-7083. doi: 10.1016/j.ijhydene.2008.09.013.

[17] Johannes, E., X. Li, J. Neels, and P. Towgood. 2008. "Transient Performance of a Non-Catalytic Syngas Generator for Active DPF Regeneration and NOx Reduction." SAE Technical Paper 2008-01-0446. doi:10.4271/2008-01-0446.

[18] Kirwan, J. E., A. A. Quader, and M. J. Grieve. 2002. "Fast Start-Up On-Board Gasoline Reformer for Near Zero Emissions in Spark-Ignition Engines." SAE Technical Paper 2002-01-1011.

[19] Golunski, S. 2010. "What is the point of on-board fuel reforming?" Energy & Environmental Science 3 (12), 1918-1923. doi:10.1039/c0ee00252f.

[20] Northrop, W. F. (2006). PERFORATED FIN HEAT EXCHANGERS AND CATALYTIC SUPPORT, US 7063131 B2

[21] Frigo, S., Gentili, R., and De Angelis, F. (2014). Further Insight into the Possibility to Fuel a SI Engine with Ammonia plus Hydrogen, SAE Technical Paper 2014-32-0082.

[22] Haputhanthri, S. (2014) Ammonia Gasoline Fuel Blends: Feasibility Study of Commercially Available Emulsifiers and Effects on Stability and Engine Performance, SAE Technical Paper 2014-?01-?2759.

[23] Shigeo Satokawa, Junji Shibata, Ken-ichi Shimizu, Atsushi Satsuma, Tadashi Hattori, "Promotion Effect of H2 on the Low Temperature Activity of the Selective Reduction of NO by Light Hydrocarbons over Ag/A1203," Applied Catalysis B: Environmental, 2003, 42, 179-186.

[24] Gu, H., Chun, K. M., and Song, S., 2015, "The Effects of Hydrogen on the Efficiency of NOx Reduction via Hydrocarbon-Selective Catalytic Reduction (HC-SCR) at Low Temperature Using Various Reductants," Int. J. Hydrogen Energy, 40(30), pp. 9602-9610.

[25] Hemmings, S., and Megaritis, A., 2012, "The Effect of a H2/CO Mixture at Varying Ratios on the Diesel Particulate Filter Regeneration Process: Towards an Optimized Fuel Reformer Design—Diesel Engine Aftertreatment System," Int. J. Hydrogen Energy, 37(17), pp. 12332-12341.

[26] Conte, E., and Boulouchos, K., 2008, "Hydrogen-Enhanced Gasoline Stratified Combustion in SI-DI Engines," J. Eng. Gas Turbines Power, 130(2), p. 22801.

[27] Fennell, D., Herreros, J. M., Tsolakis, A., Xu, H., Cockle, K., and Millington, P., 2013, "GDI Engine Performance and Emissions with Reformed Exhaust Gas Recirculation (REGR) Reformate Combustion in Gasoline Engines," SAE Tech. Pap. 2013-01-0537.

What is claimed is:

1. An engine system for internal combustion and reformation of a fuel, the engine system comprising:
an engine comprising an intake manifold for receiving a first fuel and an exhaust manifold for releasing an exhaust gas; and
a reforming reactor comprising a first end portion, a second end portion, and an elongate body defined by a longitudinal axis and a wall forming an outer surface and an inner surface, the inner surface defining an interior cavity, the reforming reactor having an inlet for receiving the first fuel, a second fuel, reactants for the first fuel, or combinations thereof, the reforming reactor comprising an internal reactor structure within at least a portion of the interior cavity,
wherein the internal reactor structure comprises a honeycomb shaped structure that extends continuously from the inlet to an outlet of the reforming reactor;
wherein the outer surface of the reforming reactor comprises a heat exchange structure selected from the group consisting of a monolith catalyst, a reticulated foam, a plurality of fins, and combinations thereof, wherein exterior surfaces of the heat exchange structure are configured to be exposed to the exhaust gas flowing within the exhaust manifold;
wherein the exhaust manifold has a housing wall that includes a first side wall, a second side wall, and lateral walls extending along the longitudinal axis from the first side wall to the second side wall, the housing wall defining an inlet for receiving the exhaust gas and an outlet for removing the exhaust gas from the exhaust manifold; wherein the reforming reactor extends from the first side wall of the exhaust manifold to the second side wall of the exhaust manifold;
wherein an annular region formed between the outer surface of the wall of the reforming reactor and the housing wall of the exhaust manifold defines an interior of the exhaust manifold; and
wherein the housing wall of the exhaust manifold forms the first end portion and the second end portion of the reforming reactor, wherein the first end portion is formed by the first side wall and the second end portion is formed by the second side wall of the exhaust manifold.

2. The engine system of claim 1, wherein an arrangement of the reforming reactor within the exhaust manifold facilitates heat exchange such that energy produced from the engine provides thermal energy to promote a reforming process in the reforming reactor.

3. The engine system of claim 1, wherein the first fuel is a diesel fuel, a gasoline fuel, a liquefied petroleum gas fuel, natural gas, ether, or alcohol.

4. The engine system of claim 1, wherein the engine system is a dual-fuel engine system where the engine includes one or more direct injectors for receiving the first fuel, and the reforming reactor includes an inlet at the first end portion for receiving the second fuel.

5. The engine system of claim 4, wherein the second fuel comprises a diesel fuel, a gasoline fuel, a liquefied petroleum gas fuel, a natural gas, an ether, an ammonia, an alcohol, or mixtures thereof.

6. The engine system of claim 1, wherein the heat exchange structure comprises a catalytic coating.

7. The engine system of claim 6, wherein the catalytic coating contains a noble metal comprising one or more of platinum, palladium, rhodium, or combinations thereof.

8. The engine system of claim 6, wherein the catalytic coating contains a base metal catalyst comprising one or more of Cu, Fe, Co, Ni, Cr, Mn, Nd, Ba, Ce, La, Pr, Mg, Ca, Zn, Nb, Zr, Mo, Sn, Ta, Sr, and combinations thereof.

9. The engine system of claim 1, wherein the first end portion of the reforming reactor includes one or more openings to allow exhaust gas to enter and flow into the interior cavity of the reforming reactor.

10. The engine system of claim 1, wherein the internal reactor structure is disposed with a catalyst coating.

11. The engine system of claim 1, wherein the heat exchange structure extends from about the inlet to about an outlet of the reforming reactor.

12. A method of reforming a fuel, the method comprising:
oxidizing unburned fuel exiting from the engine of the engine system of claim 1; and
transferring heat via exhaust gases exiting from the engine to the reforming reactor;
wherein the oxidizing and transferring heat steps occur simultaneously.

13. An engine system for internal combustion and reformation of a fuel, the engine system comprising:
an engine comprising one or more fuel injectors;
a reforming reactor having an inlet end portion for receiving a fuel, an outlet end portion, and an elongate body defined by a wall extending from the inlet end portion to the outlet end portion along a longitudinal axis; and
a manifold having an housing wall that includes a first side wall, a second side wall, and lateral wall extending along the longitudinal axis from the first side wall to the second side wall, the housing wall defining an inlet for receiving exhaust gas and an outlet for removing exhaust gas from the manifold, the housing wall of the manifold forming the inlet end portion and the outlet end portion of the reforming reactor,
wherein the inlet end portion is formed by the first side wall and the outlet end portion is formed by the second side wall of the manifold,
wherein the reforming reactor extends from the first side wall of the manifold to the second side wall of the manifold; and
wherein an annular region formed between an outer surface of the wall of the reforming reactor and the housing wall of the manifold defines an interior of the manifold.

14. The engine system of claim 13, wherein the manifold defines an annular region for receiving the exhaust gas, the annular region formed by a gap between the wall of the elongate body of the reforming reactor and the housing wall of the manifold.

15. The engine system of claim 13, wherein the annular region has an inlet opening and outlet opening, wherein the annular region is configured to flow exhaust gas in a direction from the inlet opening to the outlet opening in a first direction, and
    wherein the inlet end portion and the outlet end portion of the reforming reactor are configured to flow fuel in a second direction.

16. The engine system of claim 15, wherein the first direction and the second direction are opposite.

17. The engine system of claim 15, wherein the first direction and the second direction are the same.

18. A method of reforming an engine fuel, the method comprising:
introducing one or more fuels into the engine system of claim 13;
introducing one or more reactants to the reforming reactor; and
directing flow of an exhaust gas exiting from the engine along a flow path along the outer surface of the reforming reactor;
wherein the flow path transfers thermal energy associated with the exhaust gas indirectly to an endothermic decomposition reaction catalyst or endothermic reforming reaction catalyst of an inner catalytic support structure of the reforming reactor; and
wherein the flow path transfers thermal energy produced from the exhaust gas and chemical energy produced from an exothermic reaction of unburned fuel from the engine and residual oxygen to the endothermic decomposition reaction catalyst or the endothermic reforming reaction catalyst.

\* \* \* \* \*